United States Patent
Sood et al.

(10) Patent No.: US 8,271,477 B2
(45) Date of Patent: Sep. 18, 2012

(54) METHODS AND SYSTEMS FOR ACCESSING DATA

(75) Inventors: Manish Sood, San Mateo, CA (US); Xiaofeng Qian, Toronto (CA)

(73) Assignee: Informatica Corporation, Redwood City, CA (US)

( * ) Notice: Subject to any disclaimer, the term of this patent is extended or adjusted under 35 U.S.C. 154(b) by 168 days.

(21) Appl. No.: 11/957,398

(22) Filed: Dec. 14, 2007

(65) Prior Publication Data
US 2009/0024589 A1   Jan. 22, 2009

Related U.S. Application Data

(60) Provisional application No. 60/951,187, filed on Jul. 20, 2007, provisional application No. 60/970,257, filed on Sep. 5, 2007.

(51) Int. Cl.
*G06F 13/30* (2006.01)
(52) U.S. Cl. .................. 707/713; 707/791; 707/802
(58) Field of Classification Search ......... 707/705–716, 707/790, 795, 802, 803, 999.1
See application file for complete search history.

(56) References Cited

U.S. PATENT DOCUMENTS

| | | | |
|---|---|---|---|
| 5,600,832 A | 2/1997 | Eisenberg et al. | |
| 5,710,887 A | 1/1998 | Chelliah et al. | |
| 5,734,887 A | 3/1998 | Kingberg et al. | |
| 5,884,325 A | 3/1999 | Bauer et al. | |
| 5,956,499 A | 9/1999 | Colgan | |
| 5,970,490 A | 10/1999 | Morgenstern | |
| 6,014,647 A | 1/2000 | Nizzari et al. | |
| 6,151,608 A | 11/2000 | Abrams | |
| 6,324,541 B1 | 11/2001 | de L'Etraz et al. | |
| 6,332,163 B1 | 12/2001 | Bowman-Amuah | |
| 6,345,288 B1 | 2/2002 | Reed et al. | |
| 6,477,580 B1 | 11/2002 | Bowman-Amuah | |
| 6,519,571 B1 | 2/2003 | Guheen et al. | |
| 6,523,041 B1 | 2/2003 | Morgan et al. | |
| 6,529,909 B1 | 3/2003 | Bowman-Amuah | |
| 6,529,948 B1 | 3/2003 | Bowman-Amuah | |
| 6,542,896 B1 | 4/2003 | Gruenwald | |
| 6,604,113 B1 * | 8/2003 | Kenyon et al. ............. | 705/36 R |
| 6,718,386 B1 | 4/2004 | Hanfland | |

(Continued)

FOREIGN PATENT DOCUMENTS

AU   2003231931   12/2003

(Continued)

OTHER PUBLICATIONS

Non-Final Office Action of U.S. 2006 Appl. No. 10/449,171, Nov. 23, 2005 (mailing date) Hoang, Khnah.

(Continued)

*Primary Examiner* — Belinda Xue
(74) *Attorney, Agent, or Firm* — Adeli & Tollen LLP

(57) ABSTRACT

Some embodiments of the invention provide a user interface that allows a user to specify one or more attributes that should be included in a master reference data set, and identify which of these attributes should serve as enterprise specified identifiers that can be used to identify the particular master reference data set in an enterprise data storage. Some embodiments of the invention provide a method that allows the master reference data set to be accessed and updated in the data storage through the use of the enterprise specified identifiers.

24 Claims, 21 Drawing Sheets

U.S. PATENT DOCUMENTS

| | | | |
|---|---|---|---|
| 6,765,594 B2 | 7/2004 | Hautt et al. | |
| 6,826,568 B2 | 11/2004 | Bernstein et al. | |
| 6,839,720 B1 * | 1/2005 | Thibodeau | 1/1 |
| 6,947,951 B1 | 9/2005 | Gill | |
| 7,356,840 B1 | 4/2008 | Bedell et al. | |
| 7,401,057 B2 | 7/2008 | Eder | |
| 7,496,588 B2 | 2/2009 | Wong et al. | |
| 7,509,326 B2 | 3/2009 | Krabel et al. | |
| 7,523,121 B2 | 4/2009 | Hoang et al. | |
| 7,822,660 B1 | 10/2010 | Donoho et al. | |
| 2001/0051946 A1 | 12/2001 | Nishikawa | |
| 2002/0004793 A1 | 1/2002 | Keith, Jr. | |
| 2002/0052551 A1 | 5/2002 | Sinclair et al. | |
| 2002/0087571 A1 | 7/2002 | Stapel et al. | |
| 2002/0094711 A1 | 7/2002 | Hellbusch et al. | |
| 2003/0065659 A1 | 4/2003 | Agarwal et al. | |
| 2003/0069780 A1 | 4/2003 | Hailwood et al. | |
| 2003/0084016 A1 | 5/2003 | Norgaard et al. | |
| 2003/0105887 A1 | 6/2003 | Cox et al. | |
| 2003/0154401 A1 | 8/2003 | Hartman et al. | |
| 2003/0167253 A1 | 9/2003 | Meinig | |
| 2003/0187716 A1 | 10/2003 | Lee | |
| 2003/0195904 A1 | 10/2003 | Chestnut et al. | |
| 2003/0197733 A1 | 10/2003 | Beauchamp et al. | |
| 2003/0212654 A1 | 11/2003 | Harper et al. | |
| 2003/0217333 A1 | 11/2003 | Smith et al. | |
| 2003/0236776 A1 | 12/2003 | Nishimura et al. | |
| 2004/0006506 A1 | 1/2004 | Hoang | |
| 2004/0073567 A1 | 4/2004 | Pelon | |
| 2004/0083199 A1 | 4/2004 | Govindugari et al. | |
| 2004/0093330 A1 | 5/2004 | Westphal | |
| 2004/0117358 A1 | 6/2004 | Von Kaenel et al. | |
| 2004/0163009 A1 | 8/2004 | Goldstein et al. | |
| 2004/0215646 A1 | 10/2004 | Kaler et al. | |
| 2004/0225629 A1 | 11/2004 | Eder | |
| 2004/0230747 A1 | 11/2004 | Ims et al. | |
| 2004/0243613 A1 | 12/2004 | Pourheidari | |
| 2005/0033726 A1 | 2/2005 | Wu et al. | |
| 2005/0044009 A1 | 2/2005 | Stone et al. | |
| 2005/0066059 A1 * | 3/2005 | Zybura et al. | 709/248 |
| 2005/0076036 A1 | 4/2005 | Le | |
| 2005/0091179 A1 | 4/2005 | Kalthoff et al. | |
| 2005/0108024 A1 | 5/2005 | Fawcett et al. | |
| 2005/0149539 A1 | 7/2005 | Cameron et al. | |
| 2005/0182785 A1 | 8/2005 | Oswalt | |
| 2005/0228805 A1 | 10/2005 | Britton et al. | |
| 2005/0257193 A1 | 11/2005 | Falk et al. | |
| 2005/0278270 A1 | 12/2005 | Carr et al. | |
| 2006/0031203 A1 | 2/2006 | Rosenbaum et al. | |
| 2006/0031216 A1 | 2/2006 | Semple et al. | |
| 2006/0036755 A1 | 2/2006 | Abdullah et al. | |
| 2006/0085437 A1 | 4/2006 | Brodhun et al. | |
| 2006/0085464 A1 * | 4/2006 | Beuch et al. | 707/101 |
| 2006/0136428 A1 | 6/2006 | Syeda-Mahmood | |
| 2006/0167947 A1 | 7/2006 | Dunkle | |
| 2006/0179027 A1 | 8/2006 | Bechtel et al. | |
| 2006/0242184 A1 | 10/2006 | Shur et al. | |
| 2006/0253476 A1 | 11/2006 | Roth et al. | |
| 2006/0277176 A1 | 12/2006 | Liao | |
| 2006/0294151 A1 | 12/2006 | Wong et al. | |
| 2007/0027898 A1 | 2/2007 | Jones et al. | |
| 2007/0094286 A1 | 4/2007 | Murthy et al. | |
| 2007/0118537 A1 | 5/2007 | Schmitz et al. | |
| 2007/0156766 A1 | 7/2007 | Hoang et al. | |
| 2007/0156767 A1 | 7/2007 | Hoang et al. | |
| 2007/0214179 A1 | 9/2007 | Hoang | |
| 2008/0060058 A1 | 3/2008 | Shea et al. | |
| 2008/0275731 A1 | 11/2008 | Rao et al. | |
| 2009/0182780 A1 | 7/2009 | Wong et al. | |
| 2009/0327347 A1 | 12/2009 | Hoang et al. | |
| 2010/0121877 A1 | 5/2010 | Fawcett et al. | |

FOREIGN PATENT DOCUMENTS

| | | |
|---|---|---|
| AU | 2009222633 | 10/2009 |
| EP | 1118948 | 7/2001 |
| EP | 1509878 | 3/2005 |
| EP | 1974249 | 10/2008 |
| EP | 1974276 | 10/2008 |
| JP | 11-015903 | 1/1999 |
| JP | 11-161713 | 6/1999 |
| JP | 11-232327 | 8/1999 |
| JP | 2000-322442 | 11/2000 |
| JP | 2001-325427 | 11/2001 |
| WO | WO 01/15030 A1 | 3/2001 |
| WO | WO 01/52056 | 7/2001 |
| WO | WO 02/063491 A2 | 8/2002 |
| WO | WO 03/102867 A1 | 12/2003 |
| WO | WO 2005/064491 | 7/2005 |
| WO | WO 2007/002686 A2 | 1/2007 |
| WO | WO 2007/079467 A2 | 7/2007 |
| WO | WO 2007/081666 A2 | 7/2007 |

OTHER PUBLICATIONS

Final Office Action of U.S. Appl. No. 10/449,171, Aug. 22, 2006 (mailing date), Hoang, Khanh.

Non-Final Office Action of U.S. Appl. No. 11/169,319, Jun. 15, 2007 (mailing date), Wong, Stanley, et al.

Final Office Action of U.S. Appl. No. 11/169,319, May 28, 2008 (mailing date), Wong, Stanley, et al.

Notice of Allowance of U.S. Appl. No. 11/169,319, Sep. 29, 2008 (mailing date), Wong, Stanley, et al.

Non-Final Office Action of U.S. Appl. No. 11/325,612, Jan. 17, 2008 (mailing date), Hoang, Khanh, et al.

Final Rejection of U.S. Appl. No. 11/325,612, Sep. 30, 2008 (mailing date), Hoang, Khanh, et al.

Non-Final Office Action of U.S. Appl. No. 11/325,608, Jan. 4, 2008 (mailing date), Hoang, Khanh, et al.

Final Office Action of U.S. Appl. No. 11/325,608, Sep. 25, 2008 (mailing date), Hoang, Khanh, et al.

International Search Report for PCT/US03/17125, Sep. 11, 2003 (mailing date), Siperian, Inc.

International Preliminary Report on Patentability for PCT/US06/25017, Jan. 17, 2008 (mailing date), Siperian, Inc.

International Search Report and Written Opinion for PCT/US06/25017, Jul. 31, 2007 (mailing date), Siperian, Inc.

International Preliminary Report on Patentability for PCT/US06/62721, Jul. 17, 2008 (mailing date), Siperian, Inc.

International Search Report and Written Opinion for PCT/US06/62721, Feb. 14, 2008 (mailing date), Siperian, Inc.

International Preliminary Report on Patentability for PCT/US07/60021, Jul. 17, 2008 (mailing date), Siperian Inc.

International Search Report and Written Opinion for PCT/US07/60021, Feb. 15, 2008 (mailing date), Siperian Inc.

Yan, Lian, et al., "Improving Prediction of Custer Behavior in Nonstationary Environments," International Joint Conference on Neural Networks, Jul. 2001, vol. 3, pp. 2258-2263.

Fung, Chun Che, et al., "Intelligent Meters for Improved System Operation and Customer Relationship Management," International Conference on Power System Technology, May 2002, vol. 3, pp. 1758-1762.

Chieu, Trieu, et al., "Unified Solution for Procurement Integration and B2B Stores," ACM, Sep. 2003, pp. 61-67.

Ghemawat, Sunjay, et al., "The Google File System," ACM, Oct. 2003, pp. 29-43.

Updated portions of prosecution history of U.S. Appl. No. 10/449,171, Mar. 10, 2010, Hoang, Khanh.

Updated portions of prosecution history of U.S. Appl. No. 11/169,319, Dec. 8, 2008, Wong, Stanley, et al.

Updated portions of prosecution history of U.S. Appl. No. 11/325,612, Mar. 16, 2010, Hoang, Khanh, et al.

Office Action of U.S. Appl. No. 11/617,684, Mar. 31, 2010, Hoang, Khanh.

Updated portions of prosecution history of U.S. Appl. No. 11/325,608, Mar. 3, 2009, Hoang, Khanh, et al.

EP Office Communication of 03756308.7, Jan. 21, 2010 (mailing date), Siperian, Inc.

Supplementary European Search Report of 06840362.5, Oct. 28, 2009 (mailing date), Siperian, Inc.

EP Office Communication of 06840362.5, Nov. 10, 2009 (mailing date), Siperian, Inc.

Supplementary European Search Report of 07709912.5, Oct. 28, 2009 (mailing date), Siperian, Inc.

EP Office Communication of 07709912.5, Nov. 10, 2009 (mailing date), Siperian, Inc.

Angles, Renzo, et al., Querying RDF Data from a Graph Database Perspective, The Semantic Web: Research and Applications, May 19, 2005, pp. 346-360, vol. 3532, Springer-Verlag, Berlin/Heidelberg.

Bernstein, Philip A., et al., Principles of Transaction Processing for the Systems Professional, 1997 (Month NA), pp. 241-266 and 311-324, Morgan Kauffman Publishers, Inc., San Francisco, CA.

Elfeky, Mohamed G., et al., Tailor: A Record Linkage Toolbox, Proceedings 18$^{TH}$. International Conference on Data Engineering, Feb. 26, 2002, pp. 17-28.

Eklund, Peter, et al., OntoRama: Browsing RDF Ontologies using a Hyperbolic-style Browser, Nov. 6, 2002.

Goodman, Nathan, Bill of Materials in Relational Database, Mar. 21, 1990, pp. 2-12, Iowa City, IA, vol. 5, No. 1.

Graves, Mark, et al., Graph Database Systems, IEEE Engineering in Medicine and Biology Magazine, Nov. 1, 1995, pp. 737-745, vol. 14, No. 6.

Kiesel, Norbert, et al., Gras, a Graph-Oriented Database System for (Software) Engineering Applications, Proceeding of the Sixth International Workshop on Singapore Jul. 19-23, 1993, Jul. 19, 1993, pp. 272-286, Los Alamitos, CA.

Ponniah, Paulraj, Data Warehousing Fundamentals: A Comprehensive Guide for IT Professionals, 2001 (Month NA), John Wiley & Sons, Inc., New York, NY.

Rahm, Erhard, et al., Data Cleaning: Problems and Current Approaches, Quarterly Bulletin of the Computer Society of the IEEE Technical Committee on Data Engineering, Dec. 1, 2000, pp. 1-11, Washington, D.C.

Updated portions of prosecution history of U.S. Appl. No. 10/449,171, Mar. 3, 2011 Hoang, Khanh.

Updated portions of prosecution history of U.S. Appl. No. 11/169,319, Jan. 22, 2009, Wong, Stanley, et al.

Updated portions of prosecution history of U.S. Appl. No. 11/325,612, Apr. 26, 2011, Hoang, Khanh, et al.

Updated portions of prosecution history of U.S. Appl. No. 11/617,684, Apr. 14, 2011, Hoang, Khanh.

Updated portions of prosecution history of U.S. Appl. No. 11/325,608, Mar. 9, 2009, Hoang, Khanh, et al.

Portions of prosecution history of U.S. Appl. No. 12/404,617, Mar. 24, 2011, Hoang, Khanh, et al.

Examination Report for AU 2009222633, Dec. 8, 2010 (mailing date), Siperian Inc.

Updated portions of prosecution history of EP03756308, Jul. 30, 2010 (mailing date), Siperian Inc.

Updated portions of prosecution history of EP06840362, Mar. 22, 2011 (mailing date), Siperian Inc.

Updated portions of prosecution history of EP07709912, Jan. 18, 2011 (mailing date), Siperian Inc.

Walton, Cheryl, "Managing Multiple Databases," http://support.novell.com/techcenter/articles/nc1999__10b.html,Oct. 1, 1999, Novell.

Portions of prosecution history of U.S. Appl. No. 12/353,062, May 10, 2011, Wong, Stanley, et al.

Updated portions of prosecution history of U.S. Appl. No. 11/325,612, Jul. 6, 2011, Hoang, Khanh, et al. Updated portions of prosecution history of commonly owned U.S. Patent Application 11/325,612 (Sprn.P0003), listed as item #42 in the 1449 filed Oct. 10, 2008, including action(s) dated 07-062011 (74 pp.).

Updated portions of prosecution history of U.S. Appl. No. 12/404,617, Jun. 17, 201,1 Hoang, Khanh, et al.

U.S. Appl. No. 13/287,930, filed Nov. 2, 2011, Hoang, Khanh, et al.

Updated portions of prosecution history of U.S. Appl. No. 10/449,171 Jan. 26, 2012, Hoang, Khanh.

Updated portions of prosecution history of U.S. Appl. No. 12/353,062, Mar. 22, 2012 Wong, Stanley, et al.

Updated portions of prosecution history of U.S. Appl. No. 11/325,612, Feb. 29, 2012 Hoang, Khanh, et al.

Updated portions of prosecution history of U.S. Appl. No. 12/404,617, Oct. 18, 2011, Hoang, Khanh, et al.

Portions of prosecution history of U.S. Appl. No. 13/287,930, Jan. 17, 2012, Hoang, Khanh, et al.

Portions of prosecution history of AU2003231931, May 19, 2009, Siperian LLC.

Updatede portions of prosecution history of AU2009222633, Feb. 27, 2010, Siperian LLC.

Updated portions of prosecution history of EP03756308, Dec. 12, 2006, Siperian LLC.

Updated portions of prosecution history of EP06840362, Sep. 29, 2011, Siperian LLC.

Updated portions of prosecution history of EP077009912, Jul. 27, 2011, Siperian LLC.

* cited by examiner

205

| Master ID | First Name | Last Name | Drivers Lic. # | State | SSN # |
|---|---|---|---|---|---|
| 100 | John | Doe | A789123 | CA | 111-22-3333 |

E-commerce Vendor 1 : Enterprise 1 (215)

210

| Master ID | Last Name | SSN # | Acxiom # | Tax ID # | Zip Code |
|---|---|---|---|---|---|
| 200 | Doe | 111-22-3333 | 308038501 | 2-22-2222 | 90000 |

E-commerce Vendor 2 : Enterprise 2 (220)

*Figure 2*

METHODS AND SYSTEMS FOR ACCESSING DATA

CLAIM OF BENEFIT TO PRIOR APPLICATIONS

This Application claims benefit to U.S. Provisional Application 60/951,187, filed Jul. 20, 2007, and also claims benefit to U.S. Provisional Application 60/970,257, filed Sep. 5, 2007. These Provisional Applications are incorporated herein by reference.

FIELD OF THE INVENTION

The present invention relates to the field of data integration and management, and in particular, to methods and systems for accessing data.

BACKGROUND OF THE INVENTION

In many different enterprises, multiple applications and data sources exist which creates challenges in reconciling and managing a unified view of a data entity across an enterprise. Master data represents the common or shared entities to the transactions that record the operations of the enterprise across the various applications and data storages. Although the list is non-exhaustive, examples of entities include organizations, enterprises, companies, customers, individuals, services, accounts, products, etc. When an enterprise attempts data integration or data sharing, a fundamental problem with master data is how it is identified by the applications and data sources, as well the users (e.g., business users) trying to access this data.

A conventional approach taken by many data integration solution providers to solve the data integration and sharing problem is to standardize using a single unifying identifier that uniquely identifies an entity across all source systems. However, although it appears practical at a high level, this approach is not without its share of problems. For instance, the approach requires significant changes to the existing systems and the underlying business processes to adhere to and accommodate the unifying identifier. Any such pervasive changes across an enterprise come at a significant financial cost and run the risk of breaking the existing systems, including the underlying business processes.

Further, any subsequent changes to a data model require extensive customization and coding across many of the existing applications and data storages. Such an approach to standardize may also lead to an enterprise losing data. For example, some enterprises have "legacy" data silos, with many different applications built on top of them, that are resistant to change and cannot easily be standardized.

Moreover, such pervasive changes across an enterprise ignore the business users of the various applications and data sources as it forces the designated identifier on those business users. For instance, such change may require the business users to start utilizing an identifier that is not specific for their business needs. For the users, it is easier for them to remember and utilize the identifiers they use in a business context (e.g., driver's license number, Dun & Bradstreet number, tax identification number), rather than an identifier implemented during the integration process.

Accordingly, there is a need in the art for a data integration system that can easily integrate data from several disparate sources. Also, there is a need in the art for a data management system that can flexibly manage data.

SUMMARY OF THE INVENTION

Some embodiments of the invention provide a user interface ("UI") that allows a user to specify one or more attributes that should be included in a master reference data set, and identify which of these attributes should serve as enterprise specified identifiers ("ESIDs") that can be used to identify the particular master reference data set (e.g., master reference record) in an enterprise data storage (e.g., in a database). Some embodiments of the invention provide a method that allows the master reference data set to be accessed and updated in the data storage through the use of the ESIDs.

For each particular ESID of a master reference data set, some embodiments maintain not only the current value associated with the ESID but also the prior value or values associated with the ESID. In some cases, these prior historical values are not stored for each ESID of the master reference data set but are only stored for one or more of the ESIDs. Some embodiments allow the master reference record to be accessed and updated not only through the current value associated with the ESID but also though one or more of the previous values associated with the ESID. In other words, these embodiments can query a data storage with an old value of an ESID and still be able to identify and update the particular master reference data set.

Several examples are given below where the enterprise is a business organization. In these contexts, the ESID is referred to as a global business identifier ("GBID") because, once they are identified, they are used to drive various business processes of the business organization.

BRIEF DESCRIPTION OF THE DRAWINGS

The novel features of the invention are set forth in the appended claims. However, for purpose of explanation, several embodiments are set forth in the following figures.

FIG. 2 provides an illustrative example of several template master reference data sets in different enterprises.

DETAILED DESCRIPTION OF THE INVENTION

Figure 1:
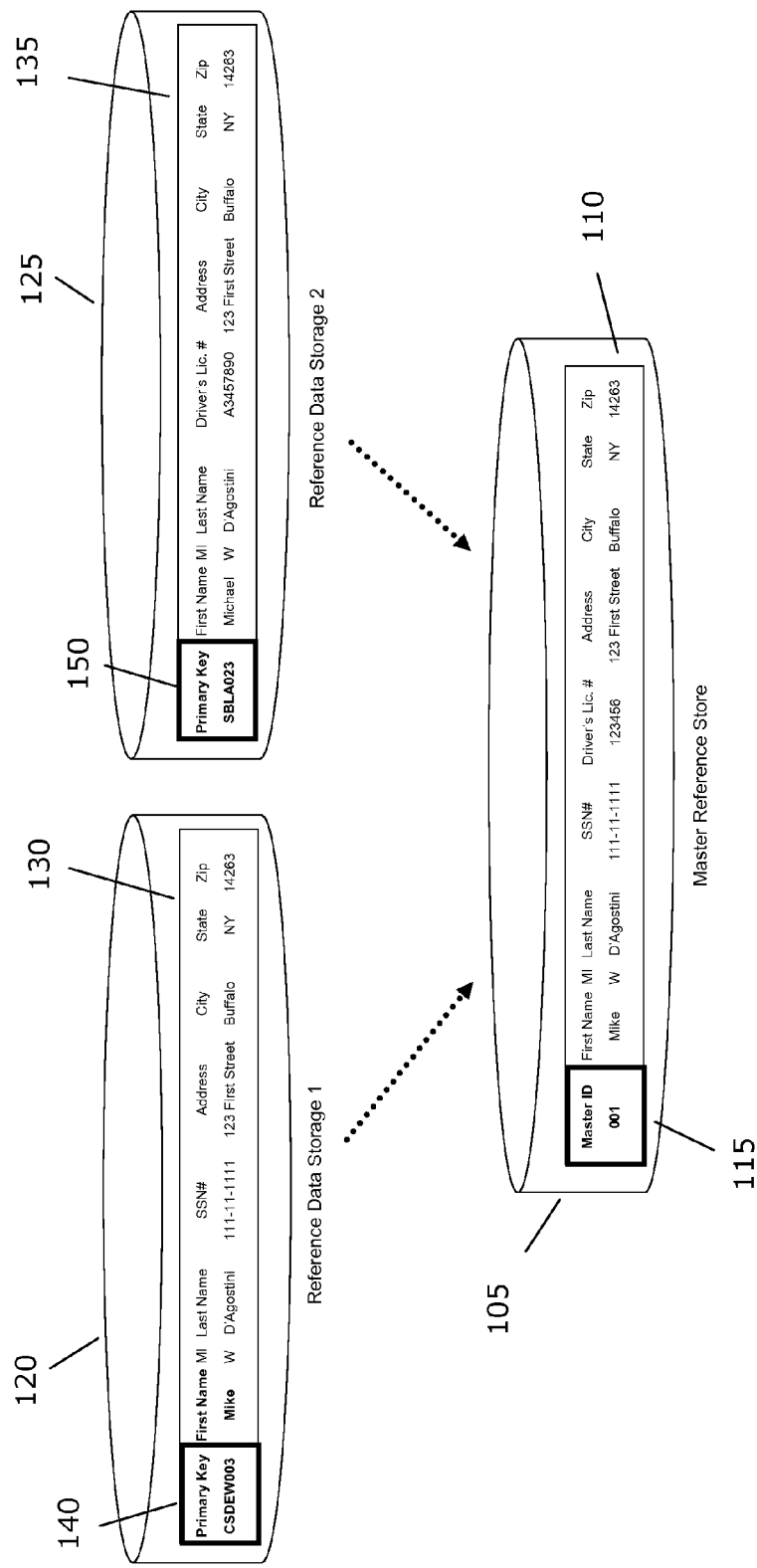
FIG. 1 provides an illustrative example of a master reference record.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a UI that allows a user to specify one or more attributes that should be included in a master reference data set, and identify which of these attributes should serve as GBIDs that can be used to identify the particular master reference data set (e.g., master reference record) in an enterprise data storage (e.g., in a database). Some embodiments of the invention provide a method that allows the master reference data set to be accessed and updated in the data storage through the use of the GBIDs.

For each particular GBID of a master reference data set, some embodiments maintain not only the current value associated with the GBID but also the prior value or values associated with the GBID. In some cases, these prior historical values are not stored for each GBID of the master reference data set but are only stored for one or more of the GBIDs. Some embodiments allow the master reference record to be accessed and updated not only through the current value associated with the GBID but also though one or more of the previous values associated with the GBID. In other words, these embodiments can query a data storage with an old value of a GBID and still be able to identify and update the particular master reference data set.

In the discussion below, Section I provides an overview of defining a master reference data set and providing a direct access path to the master reference data set through the use of GBIDs. Section II provides several examples related to accessing data sets through the use of GBIDs. Section II also introduces and provides examples related to the concepts of access by lineage and cross-reference correlation. Section III provides a data flow for a system according to some embodiments of the invention. Section IV provides an exemplary system that implements some embodiments of the invention. Section V describes a computer system with which some embodiments are implemented.

I. Overview

In many enterprises, data related to an entity such as customer or product is strewn across various systems (e.g., applications and data storages). Several of these systems have different data models and thus store their own version of the entity data. In other words, the data storages of an enterprise might store different data records for a particular entity. This redundant data may cause problems for the enterprise that uses the data. Therefore, some embodiments of the invention store a master reference data set (e.g., master reference record) or a "best version" of the reference data records for at least some of the entities in a master reference store.

FIG. 1 provides an illustrative example of a master reference record for an individual. The figure includes a master reference record 110 that is stored in a master reference store 105 and several reference records (130 and 135) that are stored in reference data storages (120 and 125). Each reference record has a primary key field (140 or 150) and several other data fields (e.g., first name, last name, address, etc.). The primary key is a unique internal key associated with a particular data record that is used in accessing (e.g., locating, updating) that particular record. The data fields are attributes that store data values that define the data record. In the example illustrated, the reference records (130 and 135) have different data fields for the same individual. For instance, the reference data record 130 in the first data storage 120 includes a field for a social security number but does not include a field for a driver's license number. Also, these reference records (130 and 135) store a different data value for the same field. For instance, the reference data record 130 of the first data storage 120 store "Mike" in the first name field, while the other reference data record 135 stores "Michael" in the same field.

The master reference record 110 has a master ID field 115 and several other data fields (e.g., first name, last name, address, etc.). The master ID is a unique identifier associated with a master reference record that is generated by the internal logic of some embodiments. Similar to the primary key of a database, the master ID is utilized by some embodiments in accessing and updating a particular master reference record. The data fields of the master reference record 110 are fields specified by the enterprise (e.g., data administrator, business user). In some embodiments, these specified fields are based on the fields of reference data sets. For example, in the example illustrated, the specified fields include all the fields in both reference records (130 and 135) such as social security number, driver's license number, etc.

As described above, in some cases, the master reference data set maintained in the master reference store 110 is the "best version" of several reference data sets. This concept of maintaining the most reliable data set is also conceptually illustrated in FIG. 1. When reference data records are consolidated (e.g., matched and merged) into a single master reference record, some embodiments provide a master reference manager that determines which one of data values of the same record fields (e.g., address field, first name field) contain the most reliable data value. In some embodiments, the master reference manger applies a concept of "trust" to these data values to determine the most reliable data value. For instance, in the example illustrated, the master reference manager has determined that "Mike" is the more reliable name for the individual than "Michael". Hence, "Mike" is the name that is stored in the master reference record 110.

FIG. 2 provides an illustrative example of several template master reference data sets for an individual in different enterprises. Specifically, this figure illustrates that different enterprises can create a data model for an entity differently. The figure includes a first template master reference data set 205 from one enterprise 215 and a second template master reference data set 210 from another enterprise 220. Each master reference data set (205 or 210) has several enterprise specified data fields and a master ID.

In the example illustrated in FIG. 2, the data fields for the template master reference data set specified by the first enterprise 215 are different from those specified by the second enterprise 220. For instance, the first enterprise 215 has specified a first name field, a last name field, a driver's license number field, a state field, and a social security number field, while the second enterprise 220 has specified a last name field, a social security number field, an Acxiom number field, a tax identification number field, and a zip code field. Hence, the first enterprise 215 has created a data model for an individual that is different from the one specified by the second enterprise 220.

Figure 3:
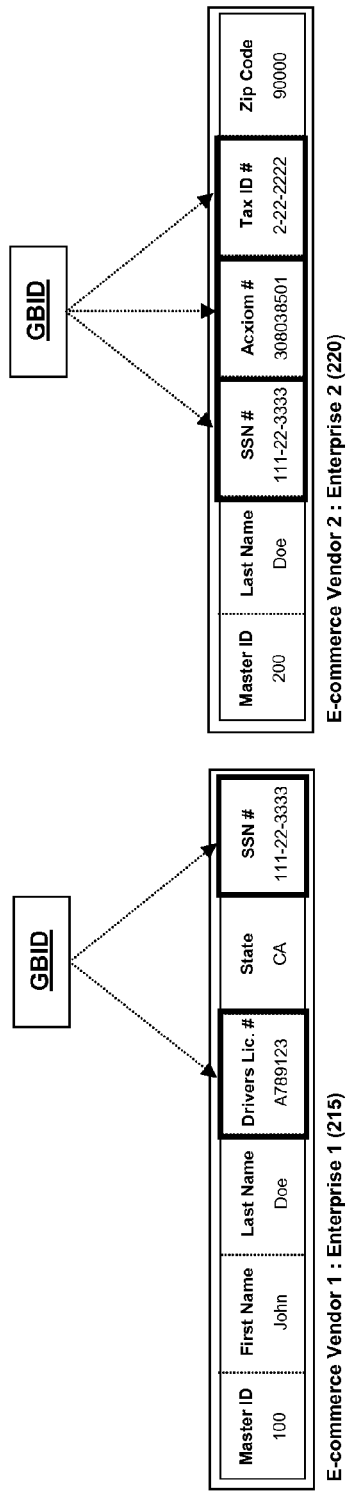
FIG. 3 provides an illustrative example of several enterprises that specify GBIDs.

As described above, the master ID is a unique identifier associated with a particular master reference record that can be used in accessing that particular record. Some embodiments provide a direct access path to the particular master reference record through one or more of the other fields. Specifically, some embodiments allow an enterprise to specify or select one or more attributes of a template master reference data set as GBIDs. Once specified, like the master ID, these GBIDs can be used in accessing (e.g., locating, updating, deleting, merging, etc.) the particular master reference record. FIG. 3 provides an illustrative example of several enterprises that specify GBIDs. This figure includes the master reference data sets (205 and 210) from the first and second enterprises (215-220), as illustrated in FIG. 2.

As illustrated, as GBIDs, the first enterprise 215 has specified the driver's license number and the social security number, while the second enterprise 220 has specified the social security number, the Acxiom number, and the tax identification number. As stated above, once specified, these GBIDs can be used in accessing the master reference data sets. For instance, in the first enterprise 215, either the driver's license number or the social security number can be used equally in accessing the master data record for "John Doe". Also, in the second enterprise, any one of the social security number, the customer number, or the tax identification number can be used equally in accessing the master data record for the same individual. Furthermore, in each enterprise, the master IDs can also be used to access the master reference data sets.

In some embodiments, the attributes specified by an enterprise are business identifiers (e.g., social security number, driver's license number) that can uniquely identify a single data record out of several data records. This characteristic of business identifiers to identify a single data record is important because it allows an enterprise to build processes (e.g., business processes) around these identifiers. For instance, a first name attribute of an individual can't be used reliably to build business processes because a data storage (e.g., master reference store) might store multiple data records with the same first name. In this instance, a business process might be broken because an update command from a business user providing the first name might lead to a different master reference record being updated than what was intended by the user. However, a social security number can be used reliably to build business processes because there is only one individual with a particular social security number.

In some embodiments, the business identifiers specified by the enterprise as GBIDs are those generated by applications in the enterprise (e.g., Systems Applications and Products ("SAP") number, Siebel number). In some embodiments, the business identifiers specified are those provided by data providers (e.g., Data Universal Numbering System ("DUNS") number, Acxiom number). In some embodiments, the business identifiers specified are those associated with an entity and are not tied to a particular data record of a database. In other words, these business identifiers are different from data record keys (e.g., primary key) that can be erased by deleting one or more database records. Examples of such business identifiers include tax identification number, driver's license number, social security number, etc.

Figure 4:
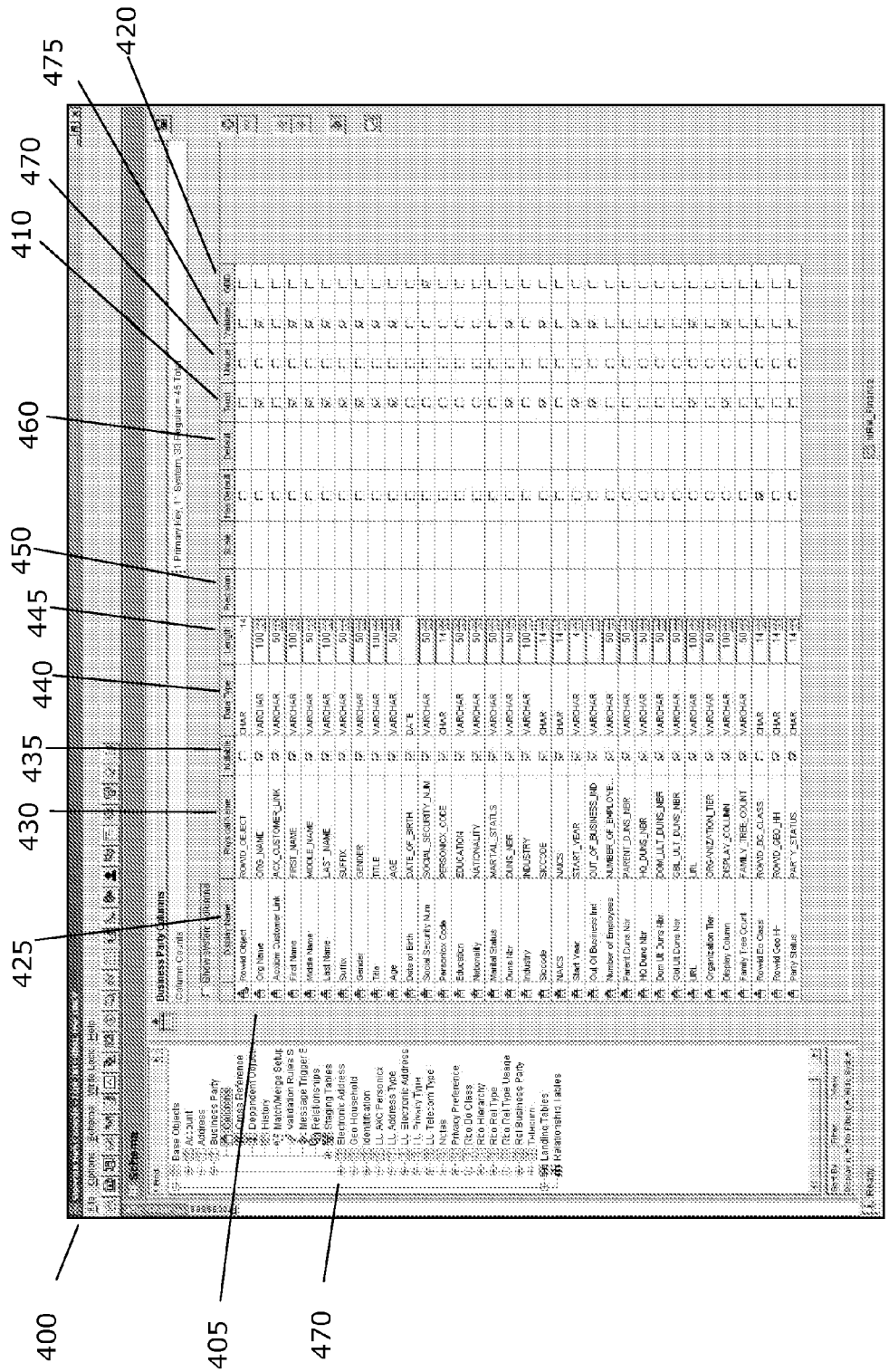
FIG. 4 provides an example of a UT that allows an enterprise to identify which attributes of a master reference data set should serve as GBIDs.

Some embodiments of the invention provide a UI that allows an enterprise to identify which attributes of a master reference data set should serve as GBIDs. FIG. 4 provides an illustrative example of one such UI. This figure includes a configuration utility 400 that has an object browser 470 and a display area 405. The object browser 470 allows a user to select a data object (e.g., customer, company) from the available data objects. For instance, in the exemplary UI illustrated, the object browser 470 lists several objects such as an account object and a business party object. When a data object is selected, the configuration utility provides one or more sets of controls in the display area 405 that allows a user to define the data object. Examples of different sets of controls that can be displayed in the display area 405 are a set of controls for defining attributes, cross-reference, dependent objects, relationship with other objects, history, match and merge rules, validation rules, message trigger, and data mapping. The concepts of matching and merging data, and data mapping are described below with respect to FIG. 20.

The set of controls for defining message triggers allows the user to specify what changes to the data object can fire messages to different applications. Also, the set of controls for defining cross-reference allows the user to define an association between the selected object and other data objects in different data storages. In some embodiments, this cross-reference correlation is defined to allow reference data sets to be automatically updated in response to an update to a master reference data set (e.g., master reference record). In some embodiments, this cross-reference correlation is defined to provide access to different types of data in several different data storages. These concepts of propagating changes and accessing different types of data in several different data storages will further be described below with respect to FIGS. 17-20.

The set of control for defining relationship allows the user to specify not only the relationship between objects but attributes of the relationship (e.g., relationship type, start and end dates, etc.). Also, the set of controls for defining dependent object allows the user to specify any dependent objects for the selected object. Dependent object are those objects that relies on another object for existence. For instance, as a dependent object, a customer object might include an address object that contains the address, state, and zip code. When the customer object is deleted, the address object will also be deleted. Hence, the address object is a dependent object of the customer object.

The set of controls for defining history allows the user to specify whether history should be maintained for the selected object and type of historical data (e.g., lineage that includes only the current value and any previous values, history that includes the previous values and information such as the source of those values). In some embodiments, this historical data is used to restore the selected object to a previous state (e.g., restore through unmerging). For enterprise specified GBIDs, some embodiments automatically maintain the historical data to provide access to data set by lineage.

In the example illustrated, the display area 405 displays the set of controls for defining the attributes of a business party object. The display area 405 is organized into several rows and columns, where each row represents a particular attribute of the data object. For instance, the display area 405 includes rows for a first name, a last name, a social security number, a DUNS number, etc.

The columns of the display 405 have several fields for a user to specify different aspects of a particular attribute that define that particular attribute. These fields include (1) a display name field 425 for specifying a display name (e.g., the logical name that is displayed in UIs), (2) a physical name field 430 for specifying an internal name (e.g., the actual name used internally), (3) a nullable field 435 for specifying whether the attribute can have no value, (4) a data type field 440 for specifying the data type of the attribute (e.g., variable characters, date, etc.), (5) a length field 445 for specifying the number of values (e.g., the total number of characters that the field accepts), (6) a precision field 450 for specifying the number of digits, (7) a default value field 460 for specifying a given value, (8) a trust field 410 for specifying whether to compute a trust score in determining the reliability of a received value, (9) a unique field 470 for determining whether the attribute stores a unique value, (10) a validate field 475 for specifying whether to perform validation logic on a received value, and (11) a GBID field 420 for specifying GBIDs.

As illustrated in FIG. 4, the social security number is identified by the enterprise as a GBID. Specifically, a user has identified the social security number by selecting the GBID field 420 (e.g., checking the GBID field using a cursor controller) in the social security number row. Although only the social security number is identified as a GBID, any number of different attributes can be identified as GBIDs. For instance, the DUNS number or any other attribute of the template master reference data set can be identified by the enterprise as GBIDs.

Figure 5:
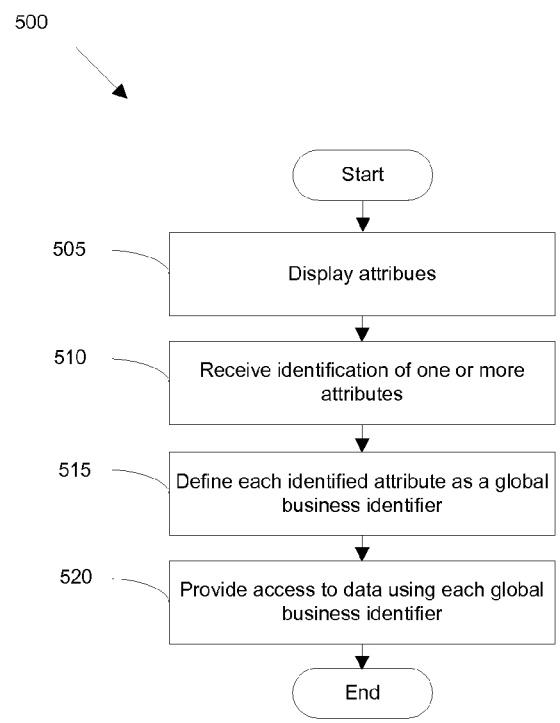
FIG. 5 illustrates a process that some embodiments utilize to provide an access path using GBIDs.

When one or more GBIDs are identified by an enterprise, some embodiments provide an access path to the master reference data set through the use of each identified GBID. FIG. 5 illustrates a process 500 that some embodiments utilize to provide the access path using GBIDs. This process 500 will be described with reference to FIG. 4. The process begins (at 505) when it displays in the display area 400 one or more attributes of a data object. Next, the process (at 510) receives selection from a user one or more attributes such as the social security number or the DUNS number.

After receiving selection of one or more attributes, the process (at 515) defines each selected attribute as a GBID. In some embodiments, the process defines the selected identifier by creating and maintaining data (e.g., metadata). For example, metadata that lists the specified GBIDs for the data object can be created and stored. Next, the process (at 520) provides the direct access path through the use of GBIDs. In some embodiment, the process provides the access path in an automated manner by generating services around those identified GBIDs. For instance, the metadata that list the GBIDS can be processed to automatically generate the services that provide the access (e.g., locate, update) capabilities. This means that different applications in an enterprise can instantly update the master reference data set using any one of the identified GBIDs.

Also, the access path is provided to the various applications and data storages in an enterprise without customization. For instance, the applications do not have to be custom coded to use one particular identifier. Also, these applications do not have to be custom coded to query and retrieve a data record key (e.g., primary key, master ID) associated with a data record to modify that data record. Instead, the applications can continue using the same identifiers that are being utilized. Hence, some embodiments of the invention provide the direct access path that allows all the different applications and data storages in the enterprise to not only coexist and remain as they are but also be connected to each other.

II. Examples

The following section provides several examples and processes related to locating and updating data sets through the use of GBIDs. This section also provides examples of accessing and updating a data set through the lineage of the GBID. Also, this section provides examples related to the concept of cross-reference correlation. In some embodiments, this cross-reference correlation allows changes to a master reference data set to be synchronized across reference data sets in several different data storages.

A. Global Business Identifiers

Figure 6:
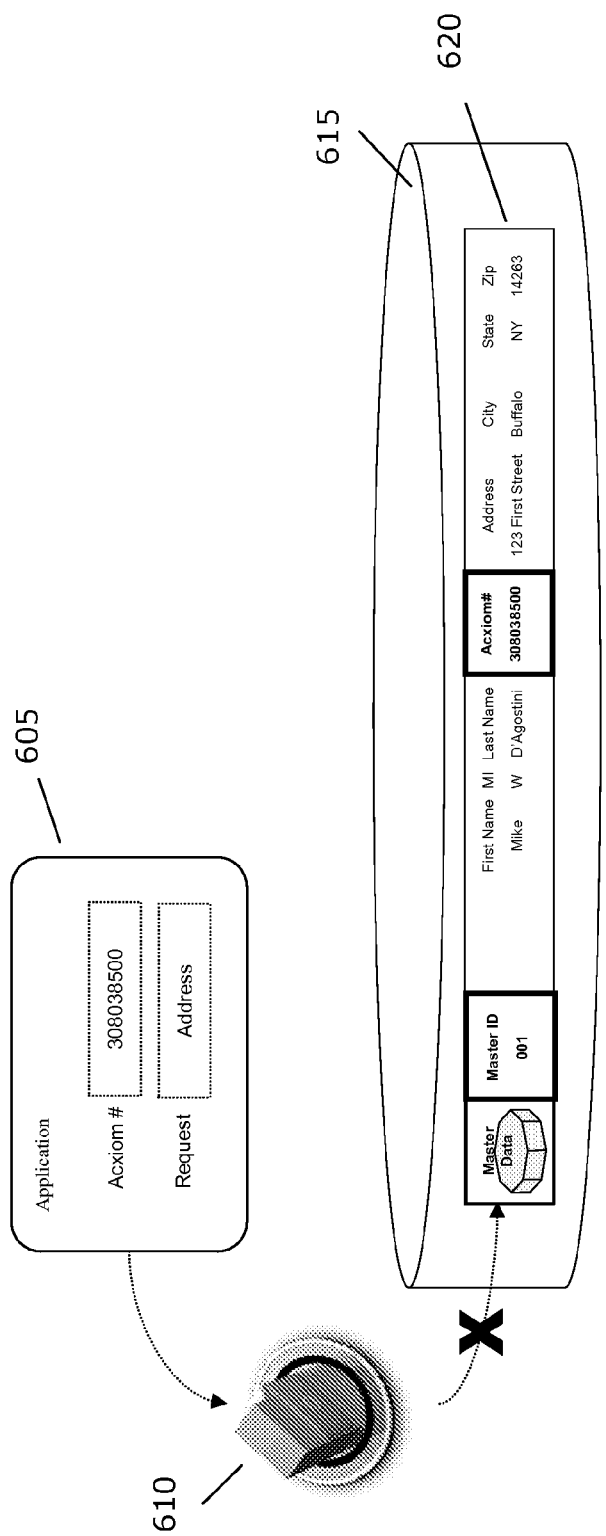
FIGS. 6-9 provide several illustrative examples of data records that are located and retrieved through the use of GBIDs.
Figure 7:
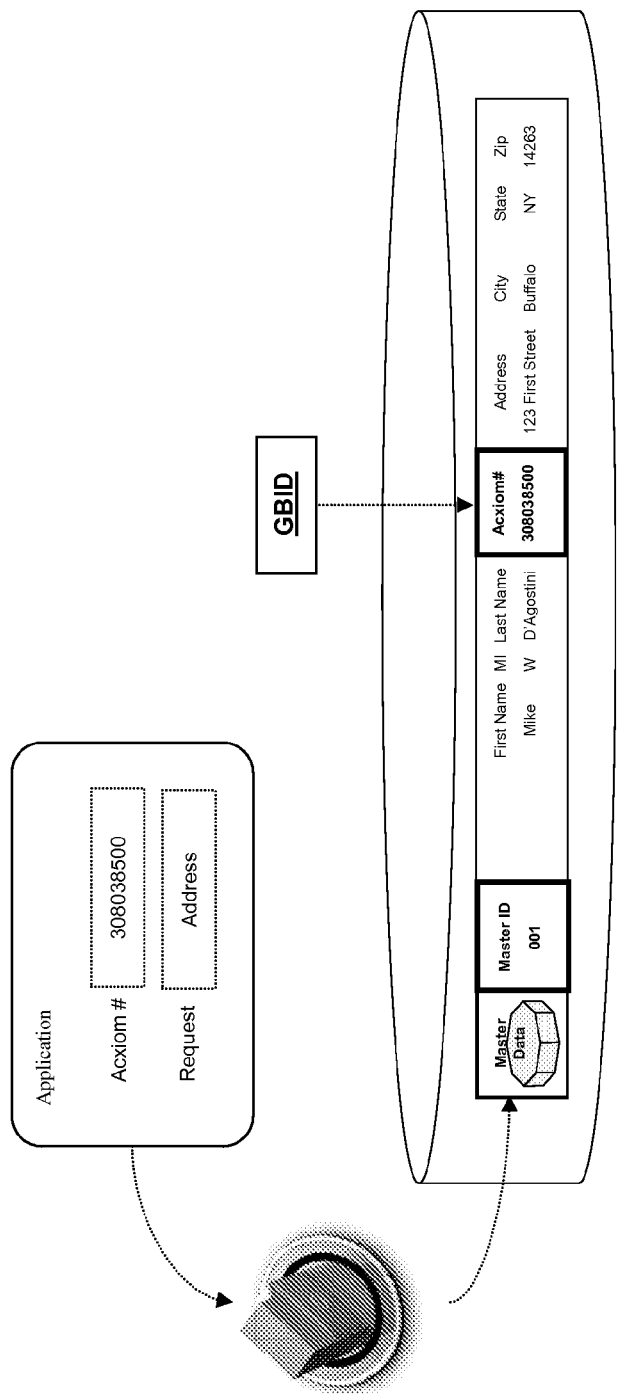

Some embodiments of the invention allow the master reference data set to be accessed (e.g., located and retrieved) through the use of the GBIDs. FIGS. 6-7 provide an illustrative example of a master data record that is located and retrieved through the use of GBIDs. These figures include a master reference manager 610, an application 605, and a master reference record 620 stored in a master reference store 615.

As described above, some embodiments of the master reference manager 610 stores and maintains the "best version" of the reference data set records for at least some of the entities in the master reference store 615. In the examples illustrated in FIGS. 6-7, the master reference manager also provides the access path to the master reference records in the master reference store 615. Also, the application 605 is any one of the various applications in an enterprise. Specifically, in these examples, the application 605 is an application that sends a request for an address stored in the master reference store 615.

FIG. 6 provides an illustrative example of retrieving the master reference record 620 before the implementation of GBIDs. Specifically, before GBIDs, the master reference manager 610 provides a direct access path to the master reference record 620 in the master reference store 615 through the use of the master ID. Therefore, in this example, when the application 605 sends a request for the address using the Acxiom number, the master reference manager 610 cannot translate or understand the request, as the request does not include the master ID of the master reference record 620. Typically, for the application 605 to receive the address using the Acxiom number, the application would have to be customized. For example, the application 605 would have to be custom coded to send one or more queries that identify the master ID associated with the Acxiom number.

FIG. 7 provides an illustrative example of retrieving the master reference record 620 after implementation of GBIDs. After implementation, the master reference manager 610 provides a direct access to the master reference record through not only the master ID but through one or more GBIDs. In this example, the Acxiom number has been designated by the enterprise as a GBID. Therefore, when the request with the Acxiom number is received, the master reference manager 610 is able to understand the request and retrieve the address for the application 605. Moreover, the application 605 is able to receive the address without having to send one or more queries to identify the master ID associated with the Acxiom number.

Figure 8:
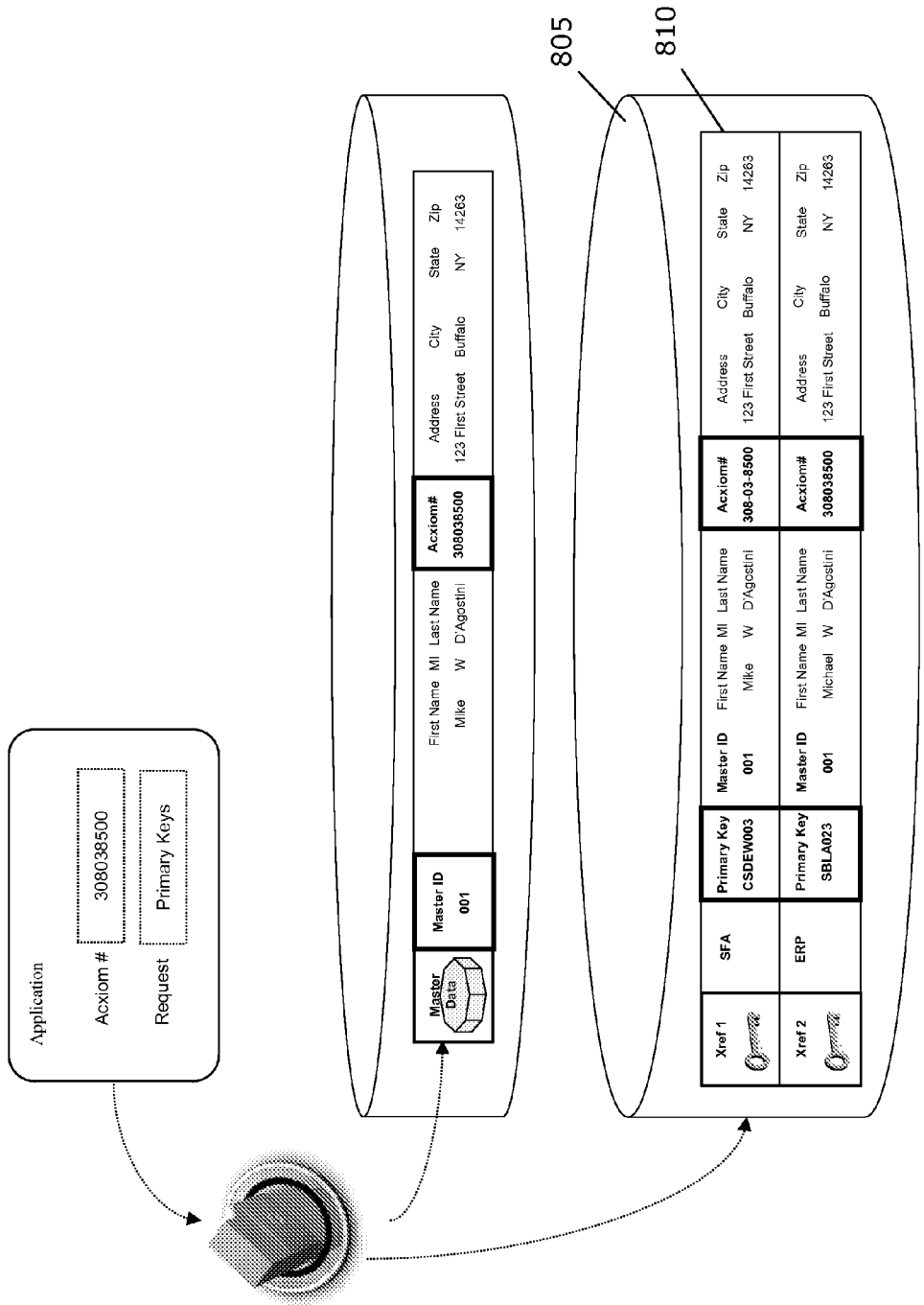

Some embodiments of the invention allow not only the master reference data sets to be accessed through GBIDs but other reference data sets as well. For instance, some embodiments of the master reference manager 610 store a cross-correlation table for each entity (e.g., customer, company, product). This cross-correlation table stores a reference data set of the entity from various applications and data sources. Some embodiments provide access to these data sets through the use of GBIDs. FIG. 8 illustrates one such example of accessing a data set in the cross-correlation table. This figures include the master reference manager 610, the application 605, and the master reference record 620 stored in the master reference store 615, as illustrated in FIGS. 6-7. In addition, this figure includes the cross-reference correlation table 810 stored in a data storage 805.

The cross-reference correlation table 810 has several correlation records from different data sources. Each correlation records include a primary key field and several other data fields. In some embodiments, the primary key value stored in the primary key field is not a primary key value generated by the data storage 805. Instead, the primary key value stored in the primary key field is a primary key of a record from a different data storage. Hence, the primary keys stored in the cross-reference correlation table are also referred to as cross-reference keys.

In some embodiments, the correlation data set are utilized by the master reference manager 610 to propagate changes to the master reference record 620 back to the data sources. For instance, when the master reference record 620 is updated with a new address, the update to the master reference record is broadcast to source data storages (that store the reference records) based on the records in the correlation table 810. In the examples illustrated, the correlation table 810 is stored in the data storage 805. However, in some embodiments, the correlation table 810 is stored in the master reference store 615. Specific example of propagating changes to a master reference record back to source records will further be described below with respect to FIG. 17.

As illustrated in FIG. 8, after implementation of GBIDs, the master reference manager 610 provides the access path to correlation records in the cross-reference correlation table 810 through the use of each designated GBID, as well as the master ID. In this example, the Acxiom number has been designated by the enterprise as a GBID. Therefore, when the request from the application 605 with the Acxiom number is received, the master reference manager 610 is able to understand the request. Moreover, the master reference manager 610 is able to retrieve the list of primary keys from the correlation table 810. Some embodiments also provide the access path to the master reference data set or correlation data set through the use of the primary keys (i.e., cross-reference keys) stored in the correlation table 810. For instance, in the example illustrated, the application 605 is able to retrieve the master reference record 620 by supplying any one of the primary keys stored in the correlation table 810.

Figure 9:
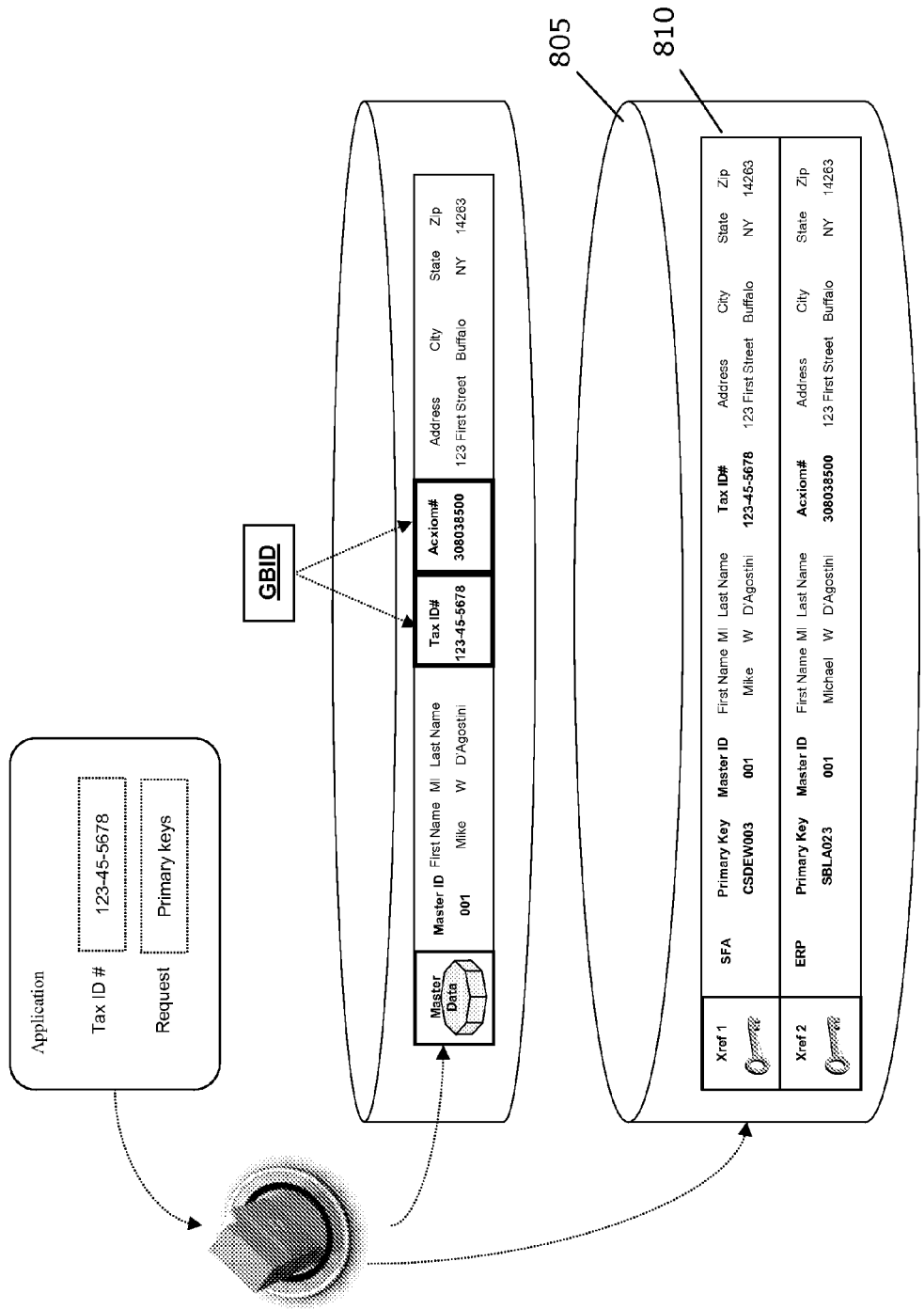

FIG. 9 provides an illustrative example of accessing data records after several GBIDs has been designated by the enterprise. Specifically, the enterprise has designated the Acxiom number and the tax identification attributes of the template master reference data set as GBIDs. Therefore, when the request from the application 605 with the either Acxiom or tax identification number is received, the master reference manager 610 is able to understand the request and retrieve the list of primary keys in the cross-reference table 810 stored in the data storage 805.

Figure 10:
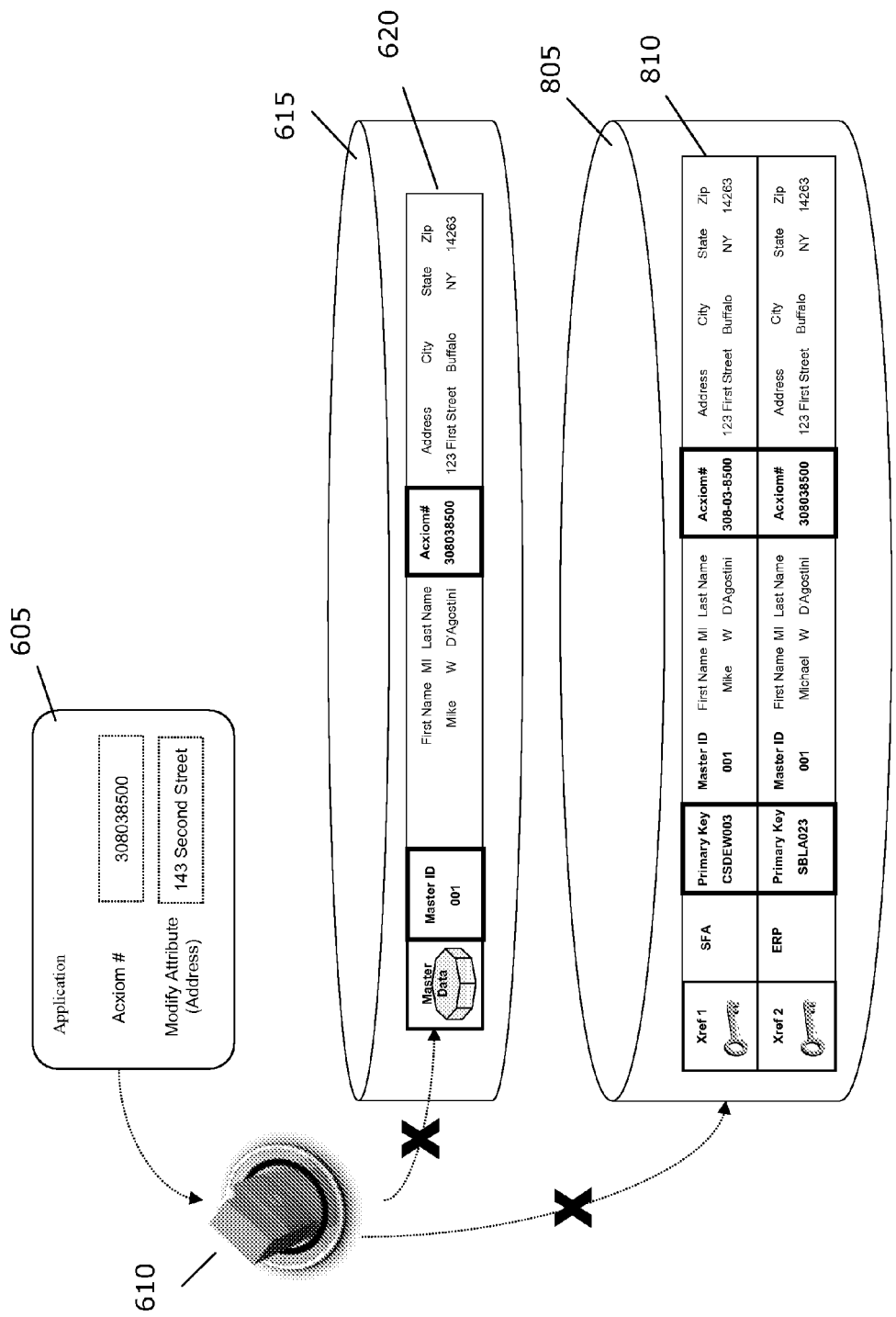
FIGS. 10-12 provide several illustrative examples of data records that are updated through the use of GBIDs.
Figure 11:
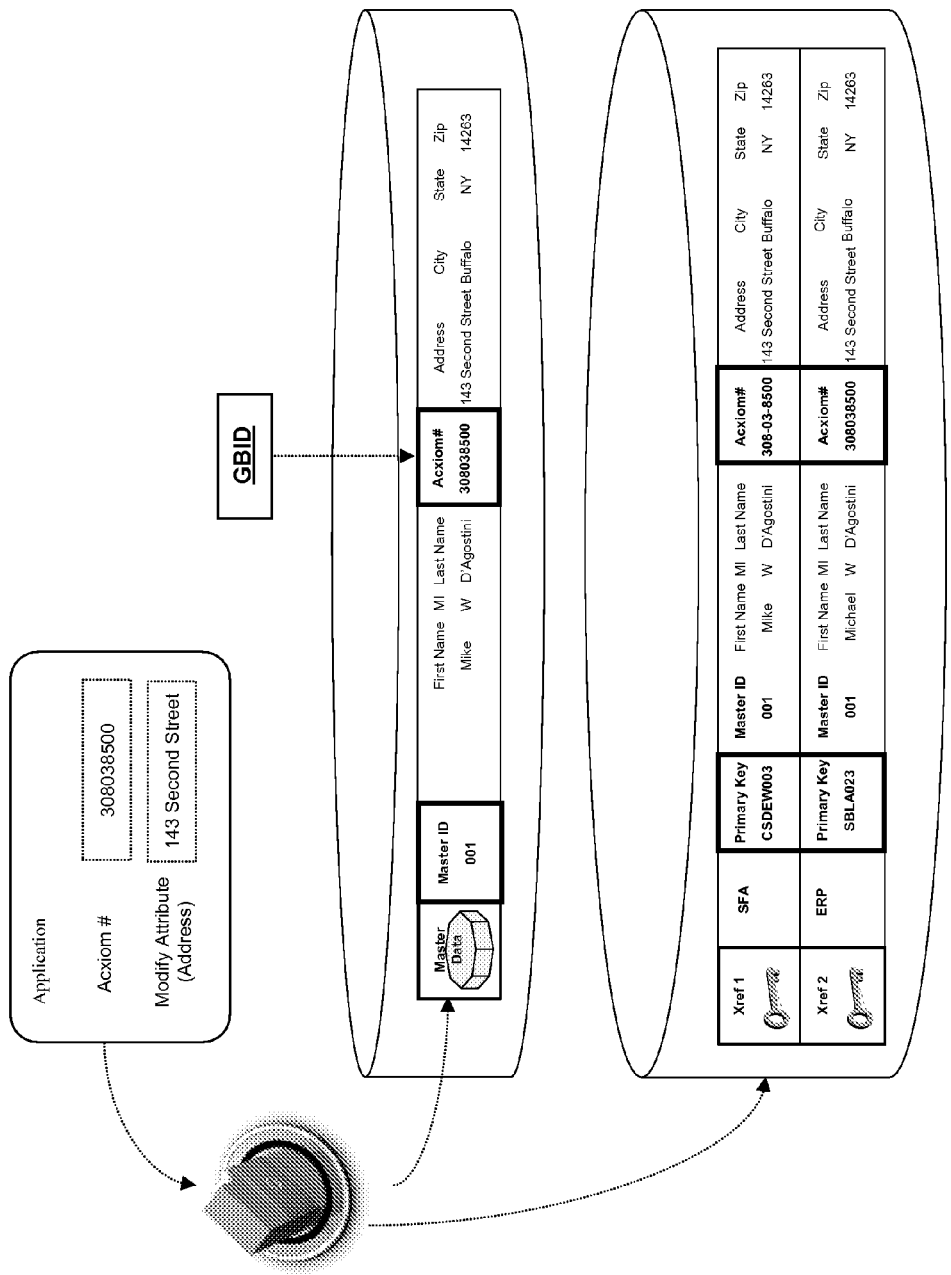
Figure 12:
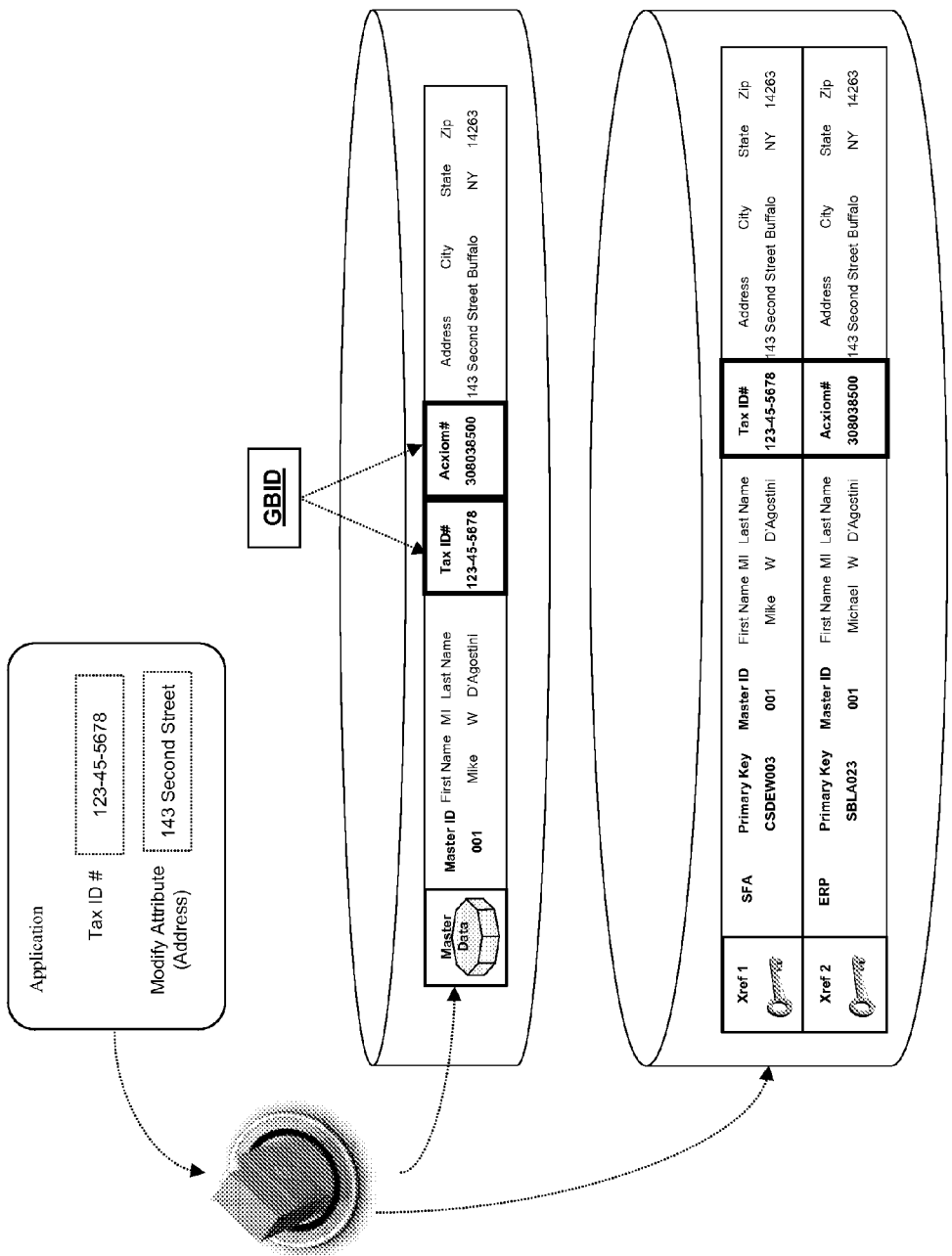

Some embodiments allow data records to be not only located but also updated in the data storage through the use of the GBIDs. FIGS. 10-12 presents illustrative examples of updating data records using GBIDs. These figures include the master reference manager 610, the application 605, the master reference record 620 stored in the master reference store 615, and the correlation table 810 stored in the data storage 805, as illustrated in FIGS. 8-9. However, in these figures, the application 605 is an application that sends a request to update the address of the master reference record 620.

FIG. 10 provides an illustrative example of updating the master reference record 620 before the implementation of GBIDs. Specifically, before GBIDs, the master reference manager 610 provides a direct update path to update the master reference record 620 in the master reference store 615 through the use of the master ID. Therefore, in this example, when the application 605 sends a request to update the address using the Acxiom number, the master reference manager 610 cannot translate or understand the request, as the request does not include the master ID of the master reference record 620. Typically, for the application 605 to update the address using the Acxiom number, the application would have to be customized. For example, the application 605 would have to be custom coded to send one or more queries that identify the master ID associated with the Acxiom number.

FIG. 11 provides an illustrative example of updating the master reference record 620 after implementation of GBIDs. After implementation, the master reference manager 610 provides a direct update path to the master reference record through not only the master ID but also through one or more GBIDs. In this example, the Acxiom number has been designated by the enterprise as a GBID. Therefore, when the request with the Acxiom number is received, the master reference manager 610 is able to understand the request and update the address associated with the master reference record 620.

Some embodiments of the invention allow not only the master reference data sets to be updated through the GBIDs but other reference data sets as well. This is also illustrated in FIG. 11. For example, when the application 605 sends the request to update the addresses, the addresses in the correlation table are also updated by the master reference manager 610.

FIG. 12 provides an illustrative example of updating the master reference record after several attributes of the template master reference data set has been designated as the GBIDs. Specifically, the enterprise has identified the Acxiom number and the tax identification of the template master reference data set as GBIDs. Therefore, in this example, the application 605 is able to update the master reference record 620 and the correlation records by sending either the Acxiom number or the tax identification number. In addition, the application can also update the master reference record using the master ID, and any one of the cross-reference keys stored in the correlation table.

Figure 13:
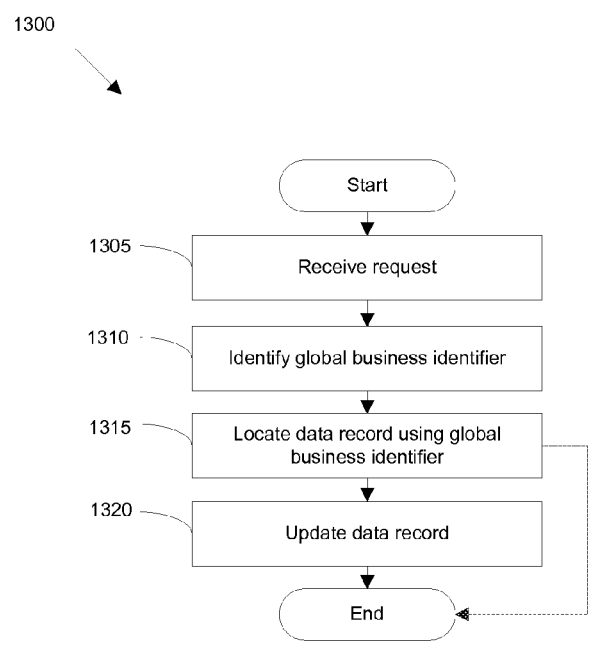
FIG. 13 illustrates a process that some embodiments utilize to access data sets in a data storage.

FIG. 13 illustrates a process 1300 that some embodiments utilize to locate or update data sets in a data storage (e.g., master reference data set in a master reference store 615). In some embodiments, this process is performed by the master reference manager 610. The process begins (at 1305) when a request to a locate or update a data record is received. The request includes a data value for a GBID. When the request is an update, the request might include other data values to update fields of the data record. For example, as illustrated in FIGS. 11-12, the request from the application 605 includes the new address for the address field of the master data record 620 associated with the Acxiom number.

After receiving the request, the process (at 1310) identifies the GBID that is included in the request. In some embodiments, the process identifies the GBID by evaluating the name associated with the GBID data value. For example, with reference to FIG. 11, when the request from the application 605 is transmitted through a web interface, the GBID data value in the request might include an associated name that identifies the data value as an Acxiom number.

Next, the process (at 1315) locates the data record in the data storage using the GBID data value. In some embodiments, when the process determines that the data record is not accessible using the GBID data value, the process ends. However, the process of some embodiments examines the history or lineage data that is maintained for the GBID. The process examines the history data to identify a current value associated with the GBID. Specific examples of locating data records through the history data of the GBID will further be described with respect to FIGS. 14-15.

When a matching record is located in the data storage using the GBID data value, the process (at 1320) updates the data record using one or more of the data values received with the request. For example, in FIGS. 11-12, the address of the master reference record 620 is updated with the new address provided by the application 605. However, when the request is not an update request but a locate request, the process 1300 sends the matching record to the requesting application and ends.

B. Access by Lineage

For each GBID identified by an enterprise, some embodiments maintain not only the current value associated with a GBID but also a prior value or values associated with the GBID. In some cases, these prior historical values are not stored for each GBID of a master reference data set but are only stored for one or more of the GBIDs. Some embodiments allow the master reference record to be accessed and updated not only through the current value associated with the GBID but also though one or more of the previous values associated with the GBID. In other words, these embodiments can query a data storage with an old value of the GBID and still be able to identify and update the particular master reference data set.

Figure 14:
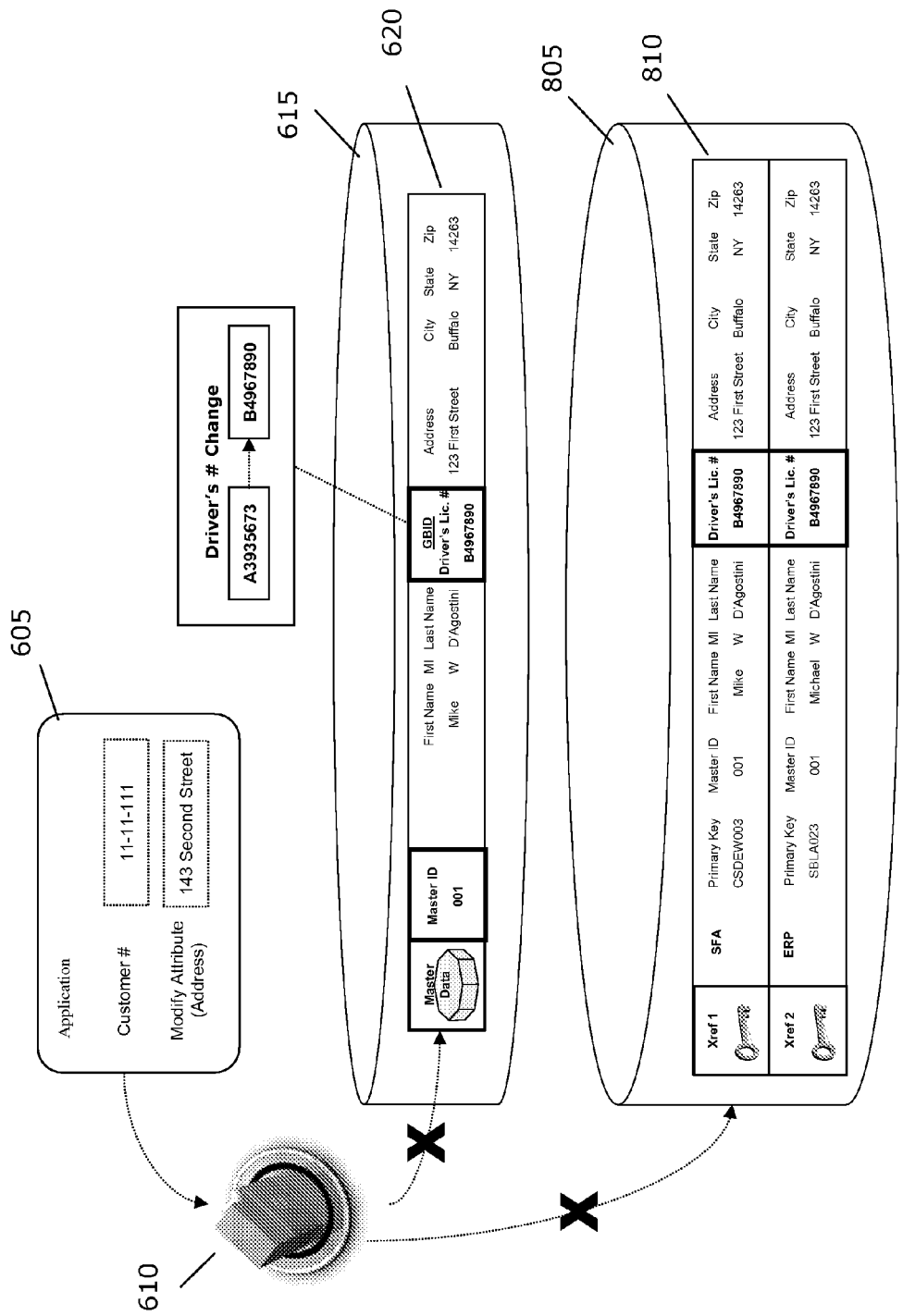
FIGS. 14-15 provide several illustrative examples regarding accessing and updating a master data record through lineage that is maintained for a GBID.
Figure 15:
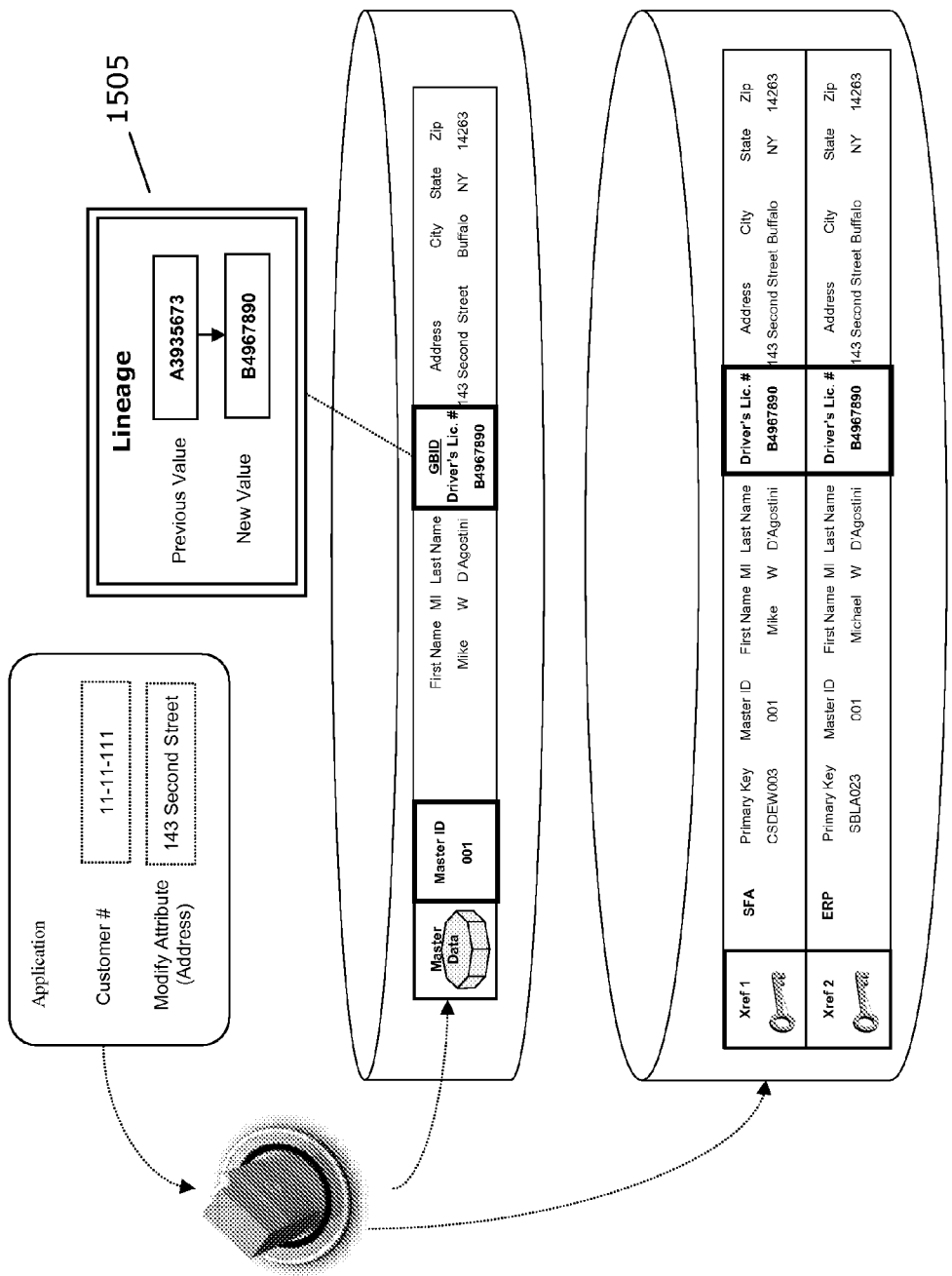

FIGS. 14-15 provide several illustrative examples regarding accessing (e.g., identifying and updating) data records through lineage data of a GBID. These figures include the master reference manager 610, the application 605, the master reference record 620 stored in the master reference store 615, and the correlation table 810 stored in the data storage 805, as illustrated in FIGS. 10-12. In these examples, the driver's license number of an individual in the master reference record 620 has changed from a previous data value to a new data value. The application 605 is an application that sends a request to update the address field of the master reference record 620 using the previous data value. Also, the master reference record 620 includes a driver's license number field that has been designated by the enterprise as the GBID.

FIG. 14 provides an illustrative example of updating a master reference record before implementation of access by lineage. In this example, when the application sends the request, the master reference manager 610 is able to understand the request because it includes the GBID. However, the master reference record 620 cannot be located and updated because the request from the application 605 has the previous data value that is no longer associated with the master reference record 620. Thus, an access path to resolve the change to the GBID does not exist. In some cases, this can cause duplicate data records to be created in a data storage. For example, in such situations, a new master reference record for the same individual as the one stored in the master reference record 620 might be created in the master reference store 615.

FIG. 15 presents an illustrative example of updating the master reference record 620 after the implementation of access by lineage. For illustrative purposes, this figure provides conceptual illustration of a lineage data 1505. The lineage data 1505 includes one or more previous values and the current value associated with the GBID. In some embodiments, the master reference manager 610 stores the lineage data 1505 in the master reference store 615.

When a master reference record cannot be located using the GBID, some embodiments of the master reference manager 610 identify the current data value associated with the GBID using the lineage data 1505. In the example illustrated, the lineage data 1505 is used to identify the current data value associated with the driver's license number. After the current data is identified, the master reference manager 610 uses the address value in the request to update the address fields of the master reference record 620 and the correlation records in the correlation table 810.

In some embodiments, the lineage data 1505 is updated each time a data attribute identified as a GBID is updated. For example, if the driver's license number data value in the master reference record 620 changes, then the master reference manager 610 updates the lineage data 1505 with the new value. Also, to provide access by lineage for master IDs, some embodiments maintain not only the current value associated with a master ID but a prior value or values associated with the master ID. This allows various applications to access a master reference record of an entity, even though the original master reference record created for the entity has been deleted or merged with another master reference record.

Figure 16:
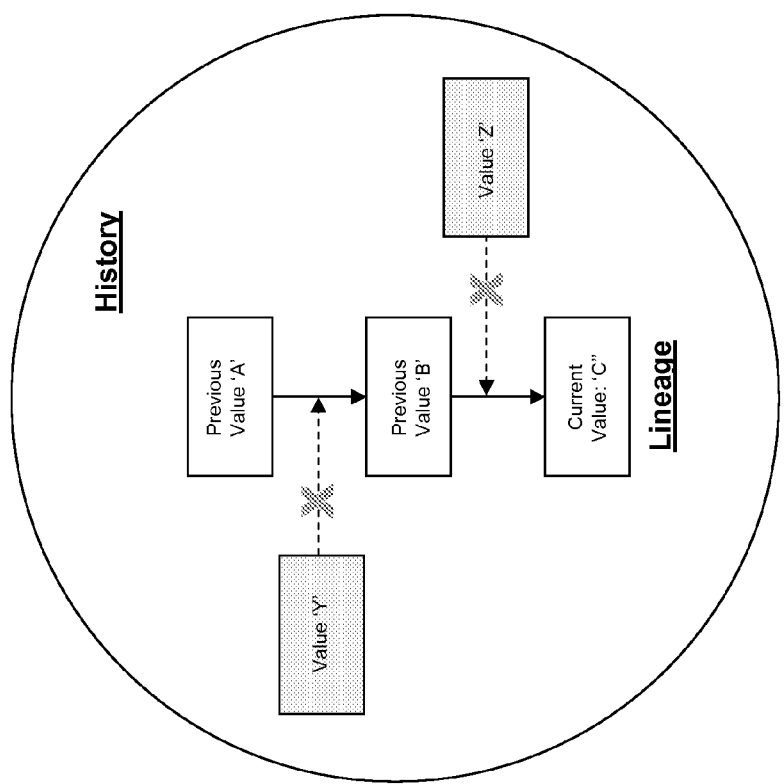
FIG. 16 provides a conceptual illustration of historical that can be maintained by some embodiments.

Some embodiments maintain not only the lineage but other historical data. FIG. 15 provides a conceptual illustration of other types of historical data that can be maintained for a GBID. While lineage includes the current value and any previous value or values, history includes several other factors that could affect the data at each point in time. For instance, history might includes values of each field in the master reference record, and the source of this value, irrespective of whether the value was ever merged into a master reference record. This distinction between the history data and the lineage data is illustrated in FIG. 16.

As illustrated, the history data not only includes previous and current values (i.e., values 'A', 'B', 'C') stored in a master reference record but also includes other values (i.e., 'Y', 'Z') that could have affected the master reference record. In some embodiments, maintaining history and lineage provides for an un-merge procedure, as will be further described below. In some embodiments, the historical data is provided to the enterprise for data management (e.g., maintenance).

C. Cross-Reference Correlation

In response to an update to a master reference data set, some embodiments update reference data sets in different data storages. Some embodiments maintain a correlation table to automatically propagate the changes to the master reference data set back to the source data storages.

Figure 17:
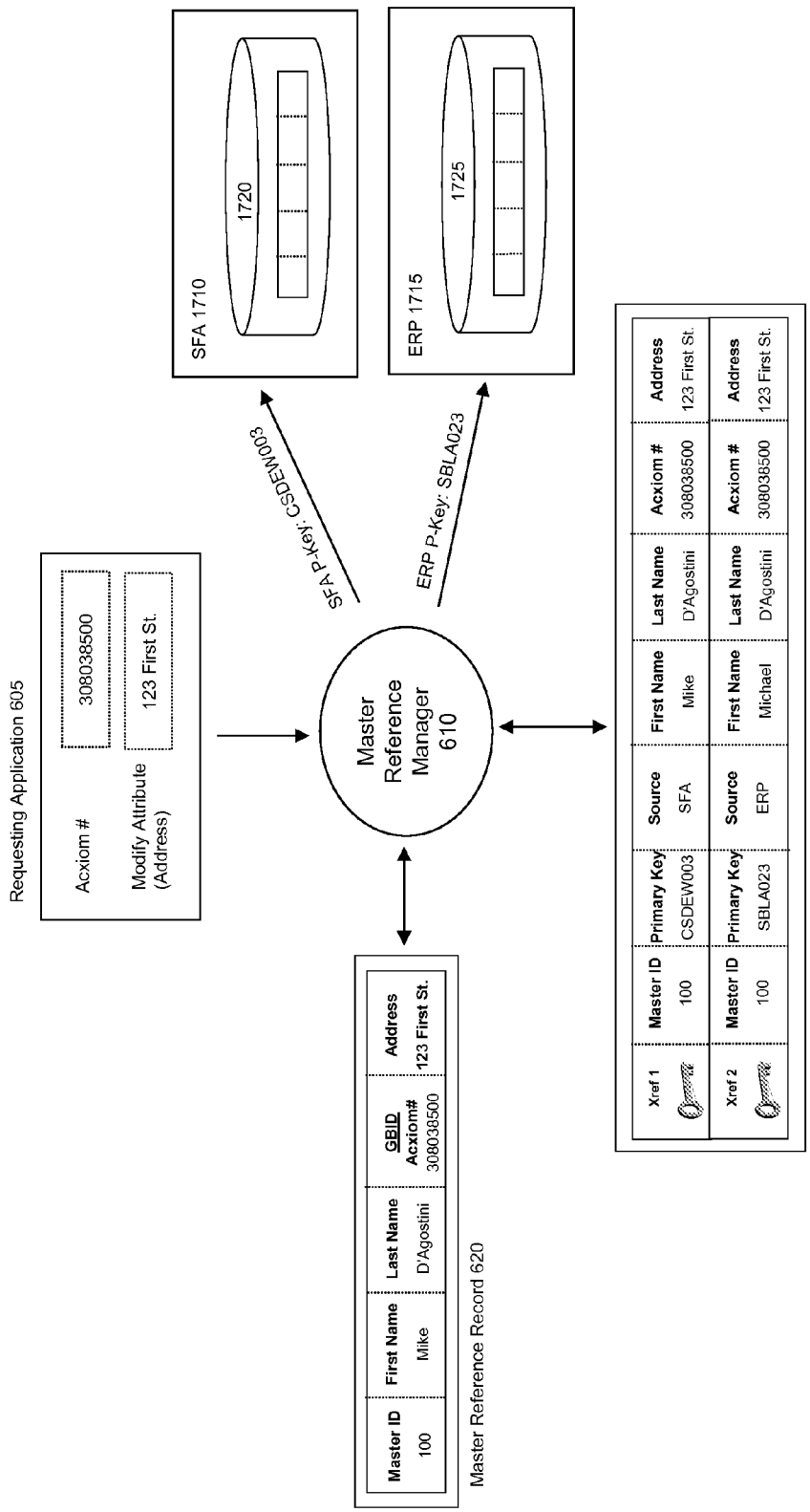
FIG. 17 presents an illustrative example of updating reference records in response to an update to the master reference record.

FIG. 17 presents an illustrative example of updating reference records in response to an update to the master reference record. The figure includes the master reference manager 610, the master reference record 620, the correlation table 810 with several correlation records, and the application 605, as illustrated in FIGS. 11-12. This figure also has a first data storage 1720 of a sales force automation ("SFA") application 1710, and a second data storage 1725 of an enterprise resource and planning ("ERP") application 1715. In this example, the master reference record 620 and the correlation table 810 are a part of the master reference manager 610. Also, the requesting application 605, the SFA application 1710, and the ERP application 1715 are different applications in the enterprise.

The correlation table 810 has several correlation records, where each record has a set of fields. In the example illustrated, the set of fields includes (1) an x-ref field, (2) a master ID field, (3) a primary key field, (4) a source field, (5) a first name field, (6) a last name field, (7) an Acxiom number field, and (8) an address field. The x-ref field stores a generated data value. In some embodiments, this generated value is used internally by the master reference manager 610 to identify a particular correlation record.

The master ID field of the correlation record stores a master ID of a particular master reference record. In some embodiments, this field associates the correlation record with the particular master reference record. In other words, this master ID field allows a one-to-many relationship to be created between a master reference record and one or more correlation records. For example, the master ID fields of several different correlation records in the correlation table might store one master ID value. Also, the source field stores a data value that identifies the source of the record. For example, in FIG. 17, the source field of the first correlation record identifies the source as the SFA application 1710, and the second correlation record identifies the source as the ERP application 1715.

In some embodiments, the primary key stored in the primary key field of the correlation table 810 is not an internally generated primary key. Instead, the primary key (i.e., natural key) is a foreign key from a reference data record from a different data storage than the one storing the correlation table 810. Hence, the primary key in the cross-reference correlation table 810 can also be referred to as a cross-reference key. When a master reference record is updated, the update message sent to each source system (e.g., applications, data storages) includes a particular cross-reference key from the correlation table. This is because the cross-reference key is the natural key that the source data storage understands to identify the reference record.

The first name field, the last name field, and the Acxiom number field store attributes related to an entity such as customer. In some embodiments, the attribute fields are used to determine if a particular data source should receive the update message when a master reference record is updated. For example, if the first correlation record of FIG. 17 does not include an address field, then the SFA application might not receive the update message. In the example illustrated, each correlation record includes the same attribute fields (i.e., first name, last name, Acxiom number). However, in some embodiments, the attribute fields of two different correlation records might differ as reference records can have different fields.

As illustrated in FIG. 17, the master reference record 620 includes an Acxiom number field that has been designated by the enterprise as a GBID. When the application 605 sends a request to update the address of the master reference record 620 using the GBID, the request is received by the master reference manager 610. The master reference manager 610 performs several operations that include (1) identifying a matching master reference record in the master reference store based on the request, (2) identifying each correlation record, and (3) sending the update message to one or more data sources based on the identified correlation records. For example, the master reference manager 610 identifies the master reference record using the received GBID value in the request. Once a matching record is identified, the manager 610 identifies each associated correlation record in the correlation table 810. In some embodiments, the master reference manager identifies the correlation records by locating any correlation records that have the master ID of the matching master reference record. Some embodiments of the master reference manager identify the correlation records using the received GBID value.

After identifying one or more correlation records, the master reference manager 610 sends the update messages to the source data storages (1720 and 1725). In some embodiments, the update messages are sent using the cross-reference keys or primary keys stored in the cross-reference table. For example, in FIG. 17, the first update message sent to the SFA application 610 includes the cross-reference key stored in the first correlation record, and the second update message sent to the ERP application 1725 includes the cross-reference key stored in the second correlation record.

Figure 18:
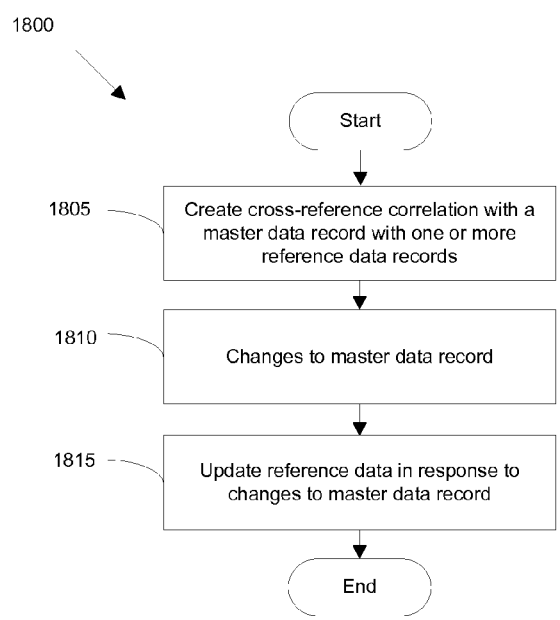
FIG. 18 illustrates a process that some embodiments utilize to update reference data sets in response to an update to a master reference data set.

FIG. 18 illustrates a process 1800 that some embodiments utilize to update reference data sets in response to an update to a master reference data set. The process 1800 of some embodiments is performed by the master reference manager 610. The process begins (at 1805) when a cross-reference correlation is created between a master data record and a reference data record. In the example illustrated in FIG. 17, the cross-reference correlation is created through the cross-correlation table 810. Specifically, the cross-reference correlation is created by storing correlation records in the cross-correlation table 810 and storing a master ID of a master reference record in the correlation records.

Next, the process (at 1810) receives an update to a master reference record. Some embodiments identify a matching master reference record in a master reference store using the GBID data value. After identifying the matching record, the process of some embodiments identifies each correlation record associated with the matching master reference record. Finally, the process (at 1815) sends an update message to one or more data sources storing reference data sets. As mentioned above, this update message is sent to each system with the primary key or cross-reference key stored in the correlation table 610.

III. Data Flow

Figure 19:
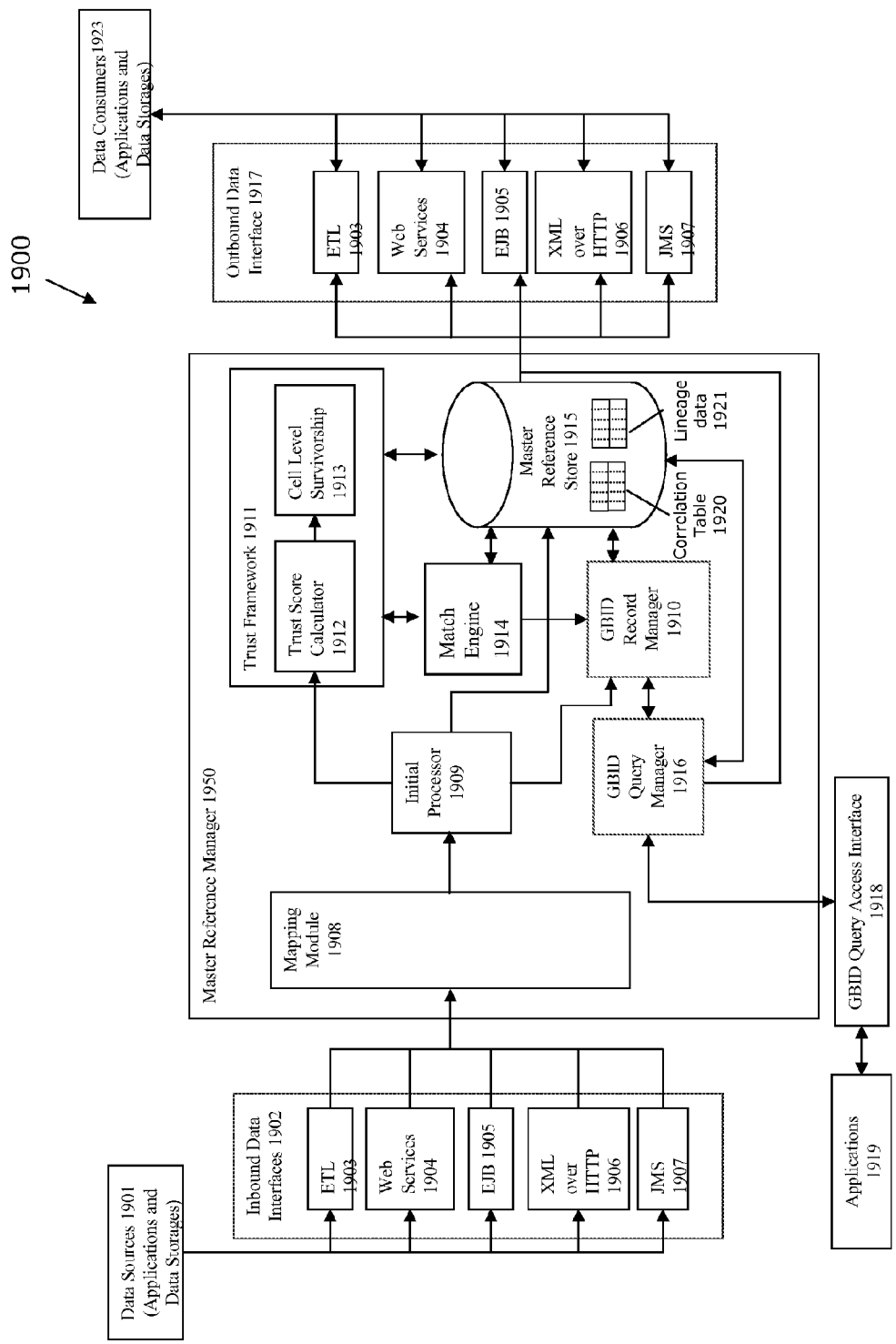
FIG. 19 illustrates a data flow for a system according to some embodiments of the invention.

FIG. 19 illustrates a data flow for a system 1900 according to some embodiments of the invention. System 1900 includes a master reference manager 1950, data sources 1901, data consumers 1923, applications 1919, inbound data interfaces 1902, and outbound data interfaces 1917. The master reference manager 1950 includes (1) a mapping module 1908, (2) an initial processor 1909, (3) a GBID record manager 1910, (4) a match engine 1914, (5) a trust framework 1911, (6) a GBID query manager 1916, and (7) a master reference store 1915.

In some embodiments, the data sources 1901 include applications and data storages, such as the applications (610 and 1715) and data storages (1720 and 1725) of FIG. 17. Similarly, in some embodiments, the data consumers 1923 include applications (e.g., 610 and 1715) and data storages (e.g., 1720 and 1725). In some cases, the data sources 1901 and the data consumers 1923 may overlap such that a source of data is also a consumer of data.

As illustrated in FIG. 19, the reference data from each of the data sources 1901 enters the master reference manager 1950 through the inbound data interfaces 1902. The inbound data interfaces 1902 include a variety of different pathway processes. For instance, data from data sources 1901 (such as a file) can enter the master reference manager 1950 through an extract-transform-load ("ETL") process 1903, which can be a typical batch or scheduled process. The data from the data sources 1901 can also enter the master reference manager 1950 through several processes that typically operate in real-time. For instance, the data can enter the master reference manager 1950 through a web services process 1904 such as web browser requests. Also, the data can enter through application server objects such those of an Enterprise Java Bean ("EJB") process 1905. This data can also enter through an XML over HTTP process 1906 (e.g., through an XML message in an HTTP request). Also, the data can enter through a Java Message Service ("JMS") process 1907 that provides a messaging interface for sending and receiving messages.

A. Mapping Incoming Data

Irrespective of whether the ETL process 1903, XML over the HTTP process 1906, or the web services process 1904 is used to receive data from the data sources 1901, the data first enters the master reference manager 1950 through the mapping module 1908, as shown in FIG. 19. When the mapping module 1908 receives the data, it performs one or more operations to internalize the data for processing and storing. These operations can include (1) delta detection, (2) data cleansing, (3) standardization, and (4) data mapping. In some embodiments, delta detection initially confirms whether the received data has actually been changed or is different from previously received data. Hence, delta detection may reduce unnecessary processing of unchanged data.

In some embodiments, mapping module 1908 performs a data cleansing operation that normalizes data for processing and storage. For example, the cleansing operation might remove extraneous blanks or other noise character, change case for an attribute, etc. In some embodiments, this format is the same format that is used to store reference data in the master reference store 1915.

In some embodiments, standardization is the process of homogenizing different data codifications. For example, in one application-centric body of data, the male gender may be codified as 'M'. In another application-centric body of data, the male gender may be codified as '1'. During standardization, the mapping module 1908 assimilates these two different coding styles into a uniform coding style for the master reference store 1915. For example, it may be that the master reference manager 1950 standardizes on male codification 'M', '1', '456', or some other value.

In some embodiments, the mapping module 1908 performs the mapping operation to map the incoming data to enterprise normalized data schema in the master reference store 1915. Schema mapping is the process of projecting incoming data from the source schema into the target schema. Application-centric data store have schema, also known as a data model, which is most conducive to the specific application that they service. The master reference store schema, similarly, will be most suitable for its purpose of managing master reference data sets. Schema mapping determines the appropriate location in the target schema for each incoming data record.

B. Initial Processor

After the data are mapped to the target data model, the data is received by the initial processor. The initial processor determines whether the received data entering the initial processor 1909 updates a master reference data set stored in the master reference store 1915. In some of embodiments, the initial processor uses the cross-reference key associated with the received data to determine whether the data updates a data set previously stored in the master reference store 1915. In some embodiments, the initial processor 1909 searches the master reference store 1915 to determine whether a master reference data set in the master reference store 1915 also has a data set with the same set of associated cross-reference keys. Some embodiments search the correlation table 1920 to determine whether the same set of associated cross-reference keys is already stored. As illustrated in FIG. 19, the cross-reference correlation table 1920 is stored in the master reference store 1915. However, the cross-reference correlation table 1921 may be stored elsewhere in a different data storage. In some embodiments, the presence of the associated cross-reference keys indicates that the data entering the master reference manager 1950 updates a master reference data set.

In some embodiments, when the initial processor 1909 determines that the data is not an update or contains new data, the initial process stores the reference data without further processing. However, in some cases, the initial processor uses the trust score calculator 1912 of the trust framework 1911 to compute trust scores for one or more attributes of the received data set before storing the data set. Computation of trust scores are described below. On the other hand, when the initial processor 1909 determines that the received data updates a previously stored master reference data set, then initial processor (1) retrieves from the master reference store the previously stored master reference data set, and (2) has the trust framework 1911 perform the update operation on the retrieved and received reference data sets.

In some embodiments, the initial processor determines whether the reference data set entering the initial processor includes one or more GBIDs. Once the initial processor determines that reference data set includes one or more GBIDs, the initial processors sends the received data to the GBID record manager 1910 for GBID processing.

C. GBID Processing

After receiving the received data, the GBID record manager 1910 performs several GBID related operations. These operations include maintaining lineage or historical data and maintaining correlation data for one or more of the received GBID data values. The correlation data (e.g., the cross-correlation table 1920) maintained by the GBID record manager 1910 allows changes to the master reference data set to be reflected across one or more data storages of the data consumers 1923. The lineage data 1921 maintained by the GBID record manager 1910 allows a master reference data set to be accessed not only through the current value associated with the GBID but also through one or more of the previous values associated with the GBID.

In some embodiments, the GBID record manager 1910 maintains the lineage data using several lineage tables. For example, if the GBID data value is a driver's license number, then the GBID record manager 1910 might store the previous driver's license number and the current driver's license number in a driver's license number table. As illustrated in FIG. 19, the lineage data 1921 is stored in the master reference store 1915. However, in some embodiments, the lineage data 1921 is stored elsewhere in a different data storage.

When the received data includes a new data record, some embodiments of the GBID record manager 1910 create a correlation record in the correlation table 1920. As described above, the correlation record creates a cross-reference correlation between a reference data record and the master reference record. In some embodiments, this cross-reference correlation is created by storing the cross-reference key (i.e., primary key) of the reference record and the master ID of the master reference record in the correlation record. In some embodiment, the GBID record manager initially identifies the master ID by creating the master reference record for the received data. After identifying the master ID, the GBID record manager 1910 creates the correlation record in the correlation table 1920 that includes both the master ID and the cross-reference key. Also, when the received data includes a new data record, some embodiments of the GBID record manager 1910 create a lineage record in the lineage data 1921 for each GBID in the received data.

When the received data updates a previously stored master reference record, the GBID record manager 1910 identifies the stored master reference record through the GBID query manager 1916. The GBID query manager 1916 retrieves the master reference record from the master reference store 1921 based on the received GBID data value. For example, the GBID query manager might locate the matching record using a social security number or a driver's license number in the received data. When the master reference record cannot be located using the GBID data value, some embodiments of the GBID query manager 1916 process the lineage data 1921 to locate the master reference record.

Once the master reference record is identified, the GBID record manager 1910 updates the master data record. When updating the matching master reference record, the GBID record manager 1910 of some embodiments uses the trust score calculator 1912 of the trust framework 1911 to compute trust scores for one or more attributes in the received data. When the received data updates one or more GBID values, the GBID record manager 1910 of some embodiments updates the lineage data 1921. For example, if a new driver's license number is received for the master reference record, then the lineage data 1921 might be updated to include the new driver's license number and the previous driver's license number.

In some embodiments, when updating the master reference record, the GBID record manager 1910 identifies each correlation records associated with the master reference record. The GBID record manager 1910 identifies the correlations record to update reference records stored in source data storages. As described above, some embodiments identify the correlation record through the master ID of the master reference record. When the correlation record is identified, the GBID record manager 1910 updates the correlation record in the correlation table 1920 and sends the update message to the source data storage. This update message to the source data storage is sent through the cross-reference key that is stored in the correlation record. The update message is sent through the cross-reference key because it is the natural key that is understood by the source data storage.

As described above, the GBID query manager 1916 identifies a matching master reference record in the master reference store 1915 based on a GBID data value (e.g., the current data value, the previous data value). In some embodiments, the GBID query manager also identifies the master reference record based on a master ID or a cross-reference key. As illustrated, the GBID query manager 1916 communicates with the GBID query access interface 1918 to locate and retrieve data records for the applications 1919. The applications 1919 are various applications in the enterprise that use GBIDs, master IDs, or cross-reference keys to locate and retrieve data records. As will be further discussed below with respect to FIG. 20, these data records include not only reference records but also activity records and relationship records.

The GBID query access interface 1918 receives a request from an application and sends the request to the GBID query manager 1916. In some embodiments, the GBID query access manager 1918 identifies a GBID, a master ID, or a cross-reference key in the request before sending the request to the GBID query manager 1916. Also, the GBID query access interface 1918 may includes one or more communications interfaces for communicating with the applications 1919, such as those listed for the inbound and outbound data interfaces (1902 and 1917). For example, the GBID query access interface 1918 might include a web service interface to communicate with an application across the internet.

As will be described below, when reference data is stored in the master reference store 1915, some embodiments further consolidate the stored data record through a match and merge process. In some embodiments, this consolidation is performed periodically or in real-time by the match/merge engine 1914. When data records are matched and merged through this engine, some embodiments of the GBID record manager 1910 perform any necessary operations to maintain the lineage and correlation. For instance, if two master reference records are merged into a single survivor, the GBID record manager 1910 might update the lineage data 1921 to include each GBID value that is no longer stored in the survivor. Also, the master ID stored in the cross-reference table 1920 may need to be updated with the master ID of the surviving master reference record.

D. Trust Framework

In some embodiments, the trust framework 1911 applies a concept of "trust" to update reference data set. The concept of trust involves a system of measuring the value and reliability of data. Trust may be represented as a numerical score as to the confidence of the system in that data. As illustrated in FIG. 19, the trust framework includes two modules, a trust score calculator 1912 and a cell-level survivorship module 1913. The trust score calculator 1912 compute the trust score for the received data set. In some cased, the trust score calculator 1912 re-compute the trust score for the previously stored data set in the master reference store 1915. In some embodiments, the trust score calculator 1912 computes trust scores for some or all of the attributes (e.g., fields) in a data set. In some embodiments, the trust score is calculated for only those attributes that are identified by the enterprise. For example, through a UI as illustrated in FIG. 4, a user can select one more attributes to compute trust scores.

This trust score calculator 1912 computes the trust score differently in different embodiments. In some embodiments, the trust score calculator 1912 computes the trust score based on certain parameters, algorithms, and rules. Examples of such parameters are source reliability weighting parameters that specify the reliability of the data source and fields from which the reference data records are provided. One example of trust rules are syntax validation rules that are used to determine the trust score of a data field based on the value of the data that is stored in that field. For instance, a syntax rule might reduce the trust score of a telephone number when the telephone number is not seven or ten digits long.

Examples of algorithms in the trust framework 1970 include data decay algorithms that express the diminishing value of data over time. Several examples of data decay profiles that can used by such data decay algorithms include (1) a linear reliability decay function, (2) a slow initial reliability decay function, and (3) a rapid initial reliability decay function. In some embodiments, the trust framework 1970 applies one of these three data reliability decay functions to the data entering the trust framework 1970 to determine the reliability of the data at a point in time. For instance, the rapid initial reliability decay function can be used to represent data that is expected to change frequently and thus become unreliable within a relatively short passage of time. This data would be expected to have an initial trust score that rapidly diminishes until its reliability (i.e., trust score) plateaus at a lower state. This feature, as represented by the rapid initial reliability decay function, can be attributed to data during scoring. Some embodiments administer data reliability decay functions and applicability to various types of data by using a data steward tool.

Thus, the trust framework 1970 includes a rule-based system of trust that includes various algorithms and parameters. The trust score calculator 1912, in the embodiments described above, applies the system of trust to compute trust scores for data entering trust framework 1970. Trust scoring begins when one or more reference records are received by the trust framework 1970 from the initial processor 1955. In some embodiments, these records are cleansed records received by the initial processor 1955. In some embodiments, these records also include stored records retrieved by the initial processor 1955 from the master reference store 1965 based on associated cross-reference keys.

Once the trust score calculator 1912 computes one or more trust scores for the reference data sets, the survivorship module 1913 consolidates the attributes of the reference data sets (i.e., the received and previously stored reference data sets) based on the computed trust scores. In some embodiments, the survivorship module 1913 will retain the attributes that have the higher calculated trust score.

The survivorship module 1913 of some embodiments maintains content metadata for each data attribute that it checks for consolidation. Two examples of content metadata are (1) the lineage of the new value and the source that provides this new value, and (2) the history of the replaced value and the source that provided the replaced value. Some embodiments maintain the full lineage and history for the replaced data fields and the data sources from which these fields emanated. Maintaining history and lineage for each field allows some embodiments to provide for an un-merge procedure, as further described below.

After the survivorship module updates any necessary content metadata, the initial processor 1909 stores the scored and/or consolidated reference data sets in the master reference store. This data then resides in the master reference store 1915 for additional updating by the master reference manager 1950, retrieval by a data consumer, and/or matching by the match/merge engine 1914. The match/merge engine 1914 will now be described.

E. Matching and Consolidation

Once reference data is stored in the master reference store 1915, some embodiments further consolidate the stored data through a match and merge process. Such consolidation includes, for instance, removal of redundant reference records and resolution of conflicting reference records.

To consolidate reference records stored in the master reference store 1915, the master reference manager 1950 includes the match/merge engine 1914. The match/merge engine 1914 may operate periodically or in real time to consolidate reference records in the master reference store 1915. The operation of the match/merge engine 1914 could be triggered by various events such as a change in a reference data record stored in the master reference store 1915. The match/merge engine may also be triggered by an identification of one or more GBID by a user. The match/merge engine 1914 may also be triggered by a change in the rules and trust algorithms relating to the trust scoring of the reference records. The data steward may further trigger the match/merge engine 1914 to specifically perform matching at various times.

When scheduled or requested, the match/merge engine 1914 determines whether a reference data record matches one or more reference data records stored in the master reference store 1915. To match existing records in the master reference store 1915, the match/merge engine 1914 of some embodiments uses a method different from the system of cross-reference keys described above in relation to updating by the initial processor 1909.

In some embodiments, the matching engine 1914 performs the matching process for each potentially matching pair of reference data sets in the master reference store 1915. The match performs the matching process by initially determining whether two pair of reference data sets matches on a first set of criteria. In some embodiments, the first set of criteria includes whether a set of X fields match between the records. To perform this determination, the matching engine of some embodiments uses SSA-NAME3 from Identity Systems, an Intellisync Company.

If the matching engine 1914 determines that the first set of criteria is not met (e.g., the set of X fields do not match), then the match/merge engine 1914 determines whether a second set of criteria are met (e.g., a different set of Z fields match). For this operation, the matching engine of some embodiments can again use the matching modules SSA-NAME3 from Identity Systems, an Intellisync Company.

The second matching determination allows the match/merge engine 1914 to differentiate between both the number and the quality of field matches. For instance, in the case where the first set of criteria comprises a set of X field matches, the set of X fields might include both a high threshold number of field matches and some particular fields that are a strong indicator of a match (e.g., the direction of the reference, start date, end date, and role fields all match, or just the start date and end date fields match). This case may represent a correct match between the records for almost every instance where the set of X fields match, and thus meeting this condition indicates a highly probable or "absolute" match.

On the other hand, the second set of criteria for the set of Z fields can include a lesser number and a lesser quality of field matches (e.g., only the direction of reference matches). If only the set of Z fields match, then there is only a possibility of a record match in this instance and this "possible" match should be queued for an individual to inspect the data and/or perform a manual-merge.

Accordingly, when the match/merge engine determines that a manual-merge might be appropriate, then the match/merge engine of some embodiments queues up the two reference data sets for a data steward to review and determine whether the two reference data sets are a match. On the other hand, when the match/merge engine determines that the two reference data sets do not meet the second set of matching criteria (i.e., determines that a manual-merge would not be appropriate), the match/merge engine specifies that the two reference data sets are not a match.

When the match/merge engine determines that the two reference data sets meet a first set of matching criteria (i.e., have a sufficient number and/or quality of fields that match), there is a high probability (i.e., virtually absolute) that the two reference data sets match. Accordingly, the match/merge engine directs the trust score calculator to compute trust scores for the attributes of the matching reference data sets.

In some embodiments, the operation of the trust score calculator 1912 during the matching process 1400 is the same as the operation of this calculator during the update process 1190. Once the trust score calculator 1912 computes one or more trust scores for the reference data set(s), the survivorship module 1913 consolidates the attributes of the reference data sets (i.e., the received and previously stored reference data sets) based on the computed trust scores. In some embodiments, the survivorship module 1913 will retain the attributes that have the higher calculated trust score. During this consolidation, the survivorship module 1913 again maintains content metadata (e.g., lineage and history) for each data attribute that it checks for consolidation. After processing by the trust framework, the match/merge engine stores the consolidate reference data set and its associated metadata in the master reference store, where it awaits for additional updating by the master reference manger, retrieval by a data consumer, and/or matching by a match/merge engine.

A data consumer can receive reference data sets from the master reference store 1915 through a variety of pathway process. In other words, reference data sets that are stored in the master reference store can be exported to outside systems such as an application, data warehouses, or application-centric data sources through the pathway process such as the ETL process 1903, the EJB process 1905, the XML over HTTP process 1906, etc.

F. Un-Merge

The advantage of tracking content metadata (e.g., lineage and history of data) will be further described by reference to an un-merge functionality of some embodiments. At times, a merge procedure will combine reliable reference data with unreliable reference data. Unreliable data may contain an error or may simply be misinterpreted data. For instance, a reference with an entity "Smith" may be mistakenly interpreted to be the same reference as entity "J. Smith". However, it may later be determined that "J. Smith" is actually a separate entity "J. Smith, Jr.". For this instance, some embodiments provide an unmerge procedure that allows the improperly merged reference for J. Smith Jr., to be extracted from the reference data for John Smith, and create a separate reference for J. Smith Jr. At other times, a change in the matching rules will cause previous merges to become obsolete, and require new merges to be performed. For these instances that result in undesired or inappropriate merges, some embodiments provide a sophisticated un-merge procedure.

The un-merge procedure will restore the various cells of a reference record for John Smith to a state prior to the merge and then re-apply all subsequent merges that did not include the (undesirable) reference data for J. Smith, Jr. Un-merge differs from a simple "undo" because it does not reverse the change to a single record. Rather, un-merge iterates through the content metadata (e.g., the history and lineage of data) to return a set of records and references affected by the un-merge to a state as if the merge with the incorrect and/or unreliable data had never occurred.

Thus, some embodiments provide an un-merge functionality that dramatically improves data reliability and quality. Moreover, some embodiments provide for several additional mechanisms such as updating, and a match and merge process, that promote a unified, consolidated view that is typically the best version of the available data. Further, these embodiments provide these functionalities and processes in real time.

IV. System

Figure 20:
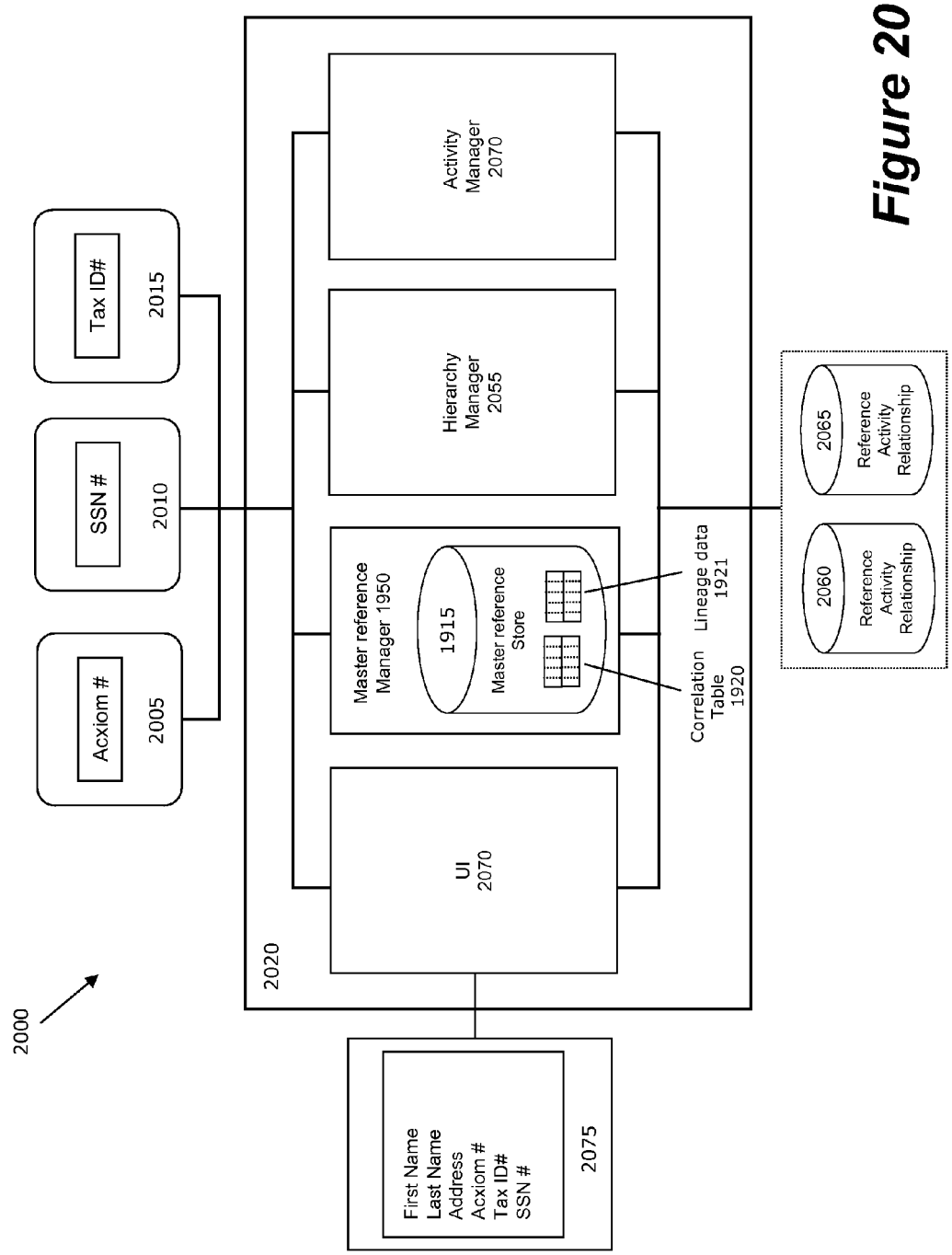
FIG. 20 provides an illustrative example of a system that implements some embodiments of the invention.

FIG. 20 provides an illustrative example of a system 2000 that implements some embodiments of the invention. An enterprise uses this system to integrate and mange data regarding various entities (e.g., customers, vendors, products, employees, etc.). As illustrated, the system 2000 includes a master reference manager 1950, an activity manager 2060, a UI 2070, and a hierarchy manager 2055, which run on one or more servers 2020. The system further includes a design-time console 2045, several applications (2005, 2010, 2015), and several data storages (2060 and 2065).

The design-time console 2075 provides a UI for a user to input application logic. An example of the UI is described above and illustrated in FIG. 4. As described above, some embodiments of the UI allow the user to (1) specify attributes of the template master reference data set and (2) identify which attributes should serve as GBIDs. After the user perform either or both these operations, the user can send the configuration data to the master reference manager 1950 using the design-time console 2075. In the exemplary system 2000, the user has specified a first name, last name, address, Acxiom number, tax identification number, and social security number, as attributes that should be included in the template master reference data set. Also, the user has identified the tax identification, social security number, and tax ID number, as GBIDs. As mentioned above with respect to FIG. 4, some embodiments of the UI 2070 also include logic that allows the user to further define the template master reference data set (e.g., define cross-reference, define match and merge rules, define rules for mapping incoming data to target data, etc.).

The master reference manager 1950 receives the template master reference data set from the design-time console 2075 and creates a master reference data (e.g., one or more tables) in the master reference store 1915 according to the template. In some embodiments, the master reference manager 1950 automatically populates the master reference data with reference records from different data storages. For example, multiple reference data records from the data storages (2060 and 2065) may be matched and merged into the master reference data based on trust scores. In some embodiment, the correlation table 1920 and lineage data 1921 is also automatically created and updated in the master reference store 1915. For example, the reference records from the data storages (2060 and 2065) and the GBID values in the reference records may be included in the correlation table 1920 and lineage data 1921, respectively.

When the GBIDs have been identified by the user, the master reference manager 1950 receives the GBIDs and provides an access path to the master reference data set through the use of the GBIDs. For example, in FIG. 20, the applications (2005, 2010, and 2015) are each able to use different identifiers (i.e., social security number, tax identification number, Acxiom number) to update the master reference data set in the master reference store 1915. In some embodiments, this access path is provided in an automated manner by processing identified GBIDs from the design-time console 2045. For example, when the GBID data for the template master reference data set is received, the master reference manager 1950 might process the data to generate the services that provide the access capabilities. This means that different applications (e.g., 2005, 2010, 2015) in the enterprise can instantly access the master reference data set through any attribute identified by the user.

As described above, some embodiments allow not only the master reference data set to be accessed (e.g., located, updated) through the use the GBIDs but other reference data sets as well (e.g., reference data set in the correlation table 1920). These reference data sets can be stored in different data storages in the enterprise. For instance, the application 2005 can use the Acxiom number to update a reference data record stored in the data storage 2060. In some embodiments, this access to the reference data sets is provided based on correlation records in the cross-reference correlation table 1920. For instance, when the application 2005 requests a reference data that is not stored in the master reference store, a federated query (i.e., distributed query) can be sent across to the different systems (e.g., data storages 2060 and 2065) in the enterprise for that reference data. In some embodiments, the federated query is sent to the different systems using the cross-reference keys of the correlation records. The cross-reference key is used to send the distributed query because it is the natural key that is understood by a particular system (e.g., data storage 2060).

Some embodiments allow not only the reference data to be accessed (e.g., located, updated) through the use the GBIDs but other types of data as well. These other types of data include activity data and relationship data. While the reference data identifies the entities that the system tracks for the enterprise, the activity data (i.e., transactional data) specifies the interaction of the entities with the enterprise, and the relationship data (i.e., hierarchical data) identifies the relationship between the entities. For instance, the activity data might include the account balance and recent transactions of a customer. Also, the relationship data might include relationship between a sales agent and the customer.

Some embodiments allow activity data to be accessed (e.g., located, updated) through the use the GBIDs. In some embodiments, this access path to the activity data is provided through the activity manger. The activity manager 2070 uses the reference data whenever an application initiates a particular interaction with the enterprise regarding a particular entity. In such a situation, the activity manager 2070 is responsible for providing a composite data object to the application, in order to allow the application to use the activity data regarding the particular interaction. A composite data object includes in some embodiments the reference data and the activity data. The reference data is provided to the activity manager 2070 from the master reference manager 1950. This reference data is an instance of all or part of the master reference record stored in the master reference store 1945 for the particular entity.

The activity data is provided to the application by sending a federated query (i.e., distributed query) across to the different systems (e.g., data storages 2060 and 2065) in the enterprise for the activity data. In some embodiments, this federated query is determined at run-time based on the correlation records in the correlation table 1920. For example, when the application 2005 sends a request for the account balance and the recent transactions of a customer associated with the Acxiom number, the request is received by the master reference manager 1915. The master reference manager identifies a master reference record and one or more correlation records associated with the master reference record. The activity manager 2070 will then receive the correlation records and coordinate the distribution of the federated query across the different system based on the correlation records.

Specifically, the activity manager will send the distributed query using the cross-reference keys in the correlation records. The cross-reference key is used to send the distributed query because it is the natural key that is understood by a particular system (e.g., data storage 2060). In some embodiments, during design time, the user can define several connections to the activity data in the different systems based on the reference data using the activity manager 2070.

Some embodiments allow relationship data to be accessed (e.g., located, updated) through the use the GBIDs. In some embodiments, this access path to the relationship data is provided through the hierarchy manager 2055. Similar to the activity manager, the hierarchy manager 2055 provides relationship data by identifying a master reference record and locating any relationship data associated with the master reference record. In some embodiments, the hierarchical manager 2055 locates the relationship data through the correlation records in the correlation table. For example, when the application 2010 sends a request for a list of people related to the customer with social security number provided, the hierarchy manager 2055 will receives the correlations records and dynamically retrieves the relationship data based on these records. The relationship data provided to the application 2010 will, in some embodiments, include not just direct relationships but indirect relationship as well. For example, the customer entity might not be directly related to a sales manager entity but may be related through one or more intermediary sales agent entities. In some embodiments, the accessed hierarchical data records are data records that are stored in a data storage managed by the hierarchy manager or master reference manager such as the master reference store.

V. Computer System

Figure 21:
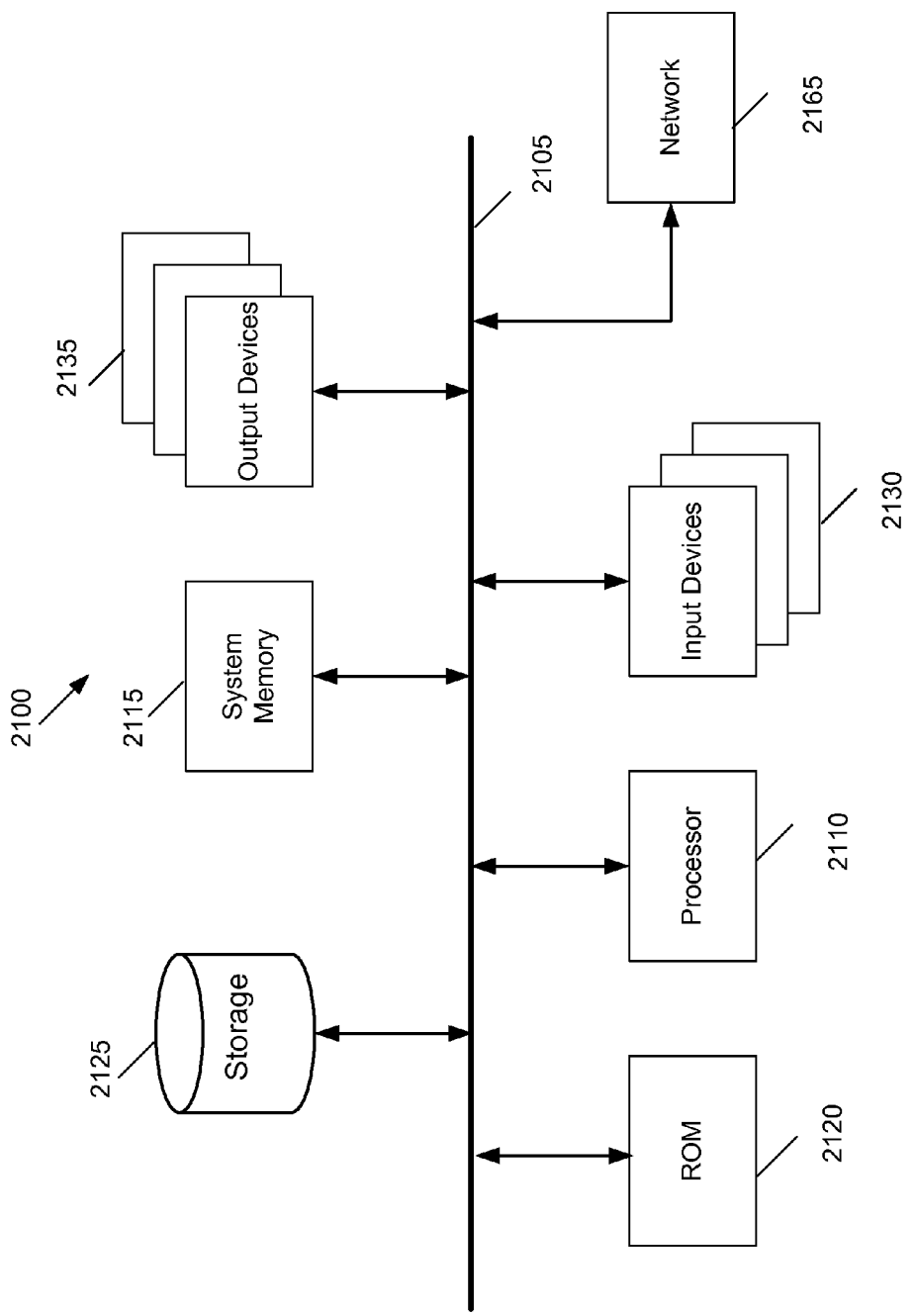
FIG. 21 conceptually illustrates a computer system with which some embodiments of the invention are implemented.

FIG. 21 conceptually illustrates a computer system with which some embodiments of the invention are implemented. The computer system 2100 includes a bus 2105, a processor 2110, a system memory 2115, a read-only memory 2120, a permanent storage device 2125, input devices 2130, and output devices 2135.

The bus 2105 collectively represents all system, peripheral, and chipset buses that support communication among internal devices of the computer system 2100. For instance, the bus 2105 communicatively connects the processor 2110 with the read-only memory 2120, the system memory 2115, and the permanent storage device 2125.

From these various memory units, the processor 2110 retrieves instructions to execute and data to process in order to execute the processes of the invention. The read-only-memory (ROM) 2120 stores static data and instructions that are needed by the processor 2110 and other modules of the computer system. The permanent storage device 2125, on the other hand, is a read-and-write memory device. This device is a non-volatile memory unit that stores instruction and data even when the computer system 2100 is off. Some embodiments of the invention use a mass-storage device (such as a magnetic or optical disk and its corresponding disk drive) as the permanent storage device 2125. Other embodiments use a removable storage device (such as a floppy disk or Zip® disk, and its corresponding disk drive) as the permanent storage device.

Like the permanent storage device 2125, the system memory 2115 is a read-and-write memory device. However, unlike storage device 2125, the system memory is a volatile read-and-write memory, such as a random access memory. The system memory stores some of the instructions and data that the processor needs at runtime.

Instructions and/or data needed to perform processes of some embodiments are stored in the system memory 2115, the permanent storage device 2125, the read-only memory 2120, or any combination of the three. For example, the various memory units may contain instructions for processing multimedia items in accordance with some embodiments. From these various memory units, the processor 2110 retrieves instructions to execute and data to process in order to execute the processes of some embodiments.

The bus 2105 also connects to the input and output devices 2130 and 2135. The input devices enable the user to communicate information and select commands to the computer system. The input devices 2130 include alphanumeric keyboards and cursor-controllers. The output devices 2135 display images generated by the computer system. For instance, these devices display IC design layouts. The output devices include printers and display devices, such as cathode ray tubes (CRT) or liquid crystal displays (LCD).

Finally, as shown in FIG. 21, bus 2105 also couples computer 2100 to a network 2165 through a network adapter (not shown). In this manner, the computer can be a part of a network of computers (such as a local area network ("LAN"), a wide area network ("WAN"), or an Intranet) or a network of networks (such as the Internet). Any or all of the components of computer system 2100 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, providing access (e.g., query, update) using different identifiers; providing access by lineage; and providing cross-reference capabilities can each be provided as part of separate computer program or components of a data management system.

In other places, various changes may be made, and equivalents may be substituted for elements described without departing from the true scope of the present invention. Thus, one of ordinary skill in the art would understand that the invention is not limited by the foregoing illustrative details but rather is to be defined by the appended claims.

What claimed is:

1. A method of accessing data related to an entity associated with an enterprise, said method comprising:
    displaying a plurality of reference data attributes for use in defining a master reference data set that is (i) for identifying the entity and (ii) for accessing data stored regarding the entity, said master reference data set representing a most reliable reference data set maintained for the entity by the enterprise;

receiving a user identification of a set of different attributes from the plurality of reference data attributes;

designating each identified attribute in the set of different attributes as a first unique identifier for uniquely identifying the master reference data set;

receiving different queries that are based on said set of different attributes, each particular query including reference data associated with an attribute designated as the first unique identifier; and processing each particular query by (i) using the reference data associated with the attribute included in the query to uniquely identify, in a first data storage, the master reference data set for the entity, the master reference data set comprising a second unique identifier, (ii) cross-correlating, by accessing a cross-correlation table that stores one or more other unique identifiers associated with the entity in different data storages, the second unique identifier to a third unique identifier associated with the entity in a second data storage different from the first data storage, and (iii) retrieving data relating to the entity from the second data storage using the third unique identifier.

2. The method of claim 1, wherein the designating comprises specifying the set of different attributes of said master reference data set as different unique keys for accessing the master reference data set.

3. The method of claim 1, wherein the set of different attributes comprises a business identifier for the entity, wherein said business identifier for the entity is an identifier that is stored in a plurality of the different data storages and that uniquely identifies reference data for the entity in each of the plurality of the different data storages.

4. The method of claim 1, wherein the designating comprises providing access to said master reference data set using each attribute in the set of different attributes.

5. The method of claim 4, wherein the second unique identifier is an internally generated default access key and the reference data associated with the attribute is not an internally generated key, the method further comprising providing access to the master reference data set using the default access key.

6. The method of claim 1, wherein the data related to the entity comprise relationship data related to the entity, said relationship data for providing a composite view of the entity's relationship to other entities associated with the enterprise.

7. The method of claim 1, wherein the data related to the entity comprise transactional data related to interactions of the entity with the enterprise.

8. The method of claim 7, wherein said master reference data set is stored in the first data storage, and the transactional data related to the entity are stored in the second data storage in the enterprise that is at a different physical location apart from the first data storage.

9. The method of claim 1, wherein at least one of the different queries is based on a previously stored attribute value that is not a current value stored for the entity.

10. The method of claim 1, wherein the data relating to the entity are stored in a plurality of the different data storages, said method further comprising enabling cross-reference correlation for updating the data of the entity in the plurality of the different data storages in response to an update to the master reference data set.

11. The method of claim 1, wherein displaying the plurality of reference data attributes comprises displaying the plurality of reference data attributes in a user interface ("UI") that includes corresponding user-selectable items for receiving selection of the set of different attributes to be designated as unique identifiers for accessing the entity data.

12. An apparatus for accessing data related to an entity associated with an enterprise, the apparatus comprising:
a user interface module (i) to display a plurality of reference data attributes for use in defining a master reference data set that represents a most reliable reference data set maintained by the enterprise for identifying the entity and for accessing data stored regarding the entity, and (ii) to receive user identification of different sets of attributes as different sets of unique identifiers for uniquely identifying the master reference data set;
a master reference manager (i) to receive a plurality of reference data sets relating to the entity, and (ii) to consolidate the received reference data sets into the master reference data set in a first data storage; and
a data retrieval module (i) to receive different queries that are based on said different sets of unique identifiers, each particular query including reference data associated with an attribute in the different sets of attributes, and (ii) to process each particular query by (a) using the reference data associated with the attribute included in the query to uniquely identify, in the first data storage, the master reference data set for the entity, the master reference data set comprising a first unique identifier, (b) cross-correlating, by accessing a cross-correlation table that stores one or more other unique identifiers associated with the entity in different data storages, the first unique identifier to a second unique identifier associated with the entity in a second data storage different from the first data storage, and (c) retrieving data related to the entity from at least the second data storage using the second unique identifier.

13. A method of providing access to data related to an entity associated with an enterprise, said data stored in a plurality of different data storages that are accessible by a plurality of different applications to retrieve the data related to the entity, the method comprising:
consolidating reference data sets that are related to the entity and stored in the different data storages into a master reference data set representing a most reliable reference data set maintained by the enterprise for identifying the entity, said master reference data set defined by a plurality of reference attributes;
receiving different data access requests from the plurality of different applications, at least two requests utilizing two different reference attributes as unique identifiers for the entity, each particular request including reference data associated with a reference attribute that uniquely identifies the master reference data set; and
processing each particular request by (i) using the reference data associated with the reference attribute included in the request to uniquely identify the master reference data set for the entity from a first data storage, the master reference data set comprising a first unique identifier (ii) cross-correlating, by accessing a cross-correlation table that stores one or more other unique identifiers associated with the entity in the different data storages, the first unique identifier to a second unique identifier associated with the entity in a second data storage different from the first data storage, and (iii) retrieving data related to the entity from at least the second data storage using the second unique identifier.

14. The method of claim 13, wherein at least one of the different data access requests utilizes a previous data value that is not a current value of said reference attribute to identify the master reference data set.

15. The method of claim 13 further comprising updating the master reference data set using at least one other data value in one of the data access requests.

16. The method of claim 15, wherein the second data storage is at a different physical location apart from the first data storage, wherein the method further comprises updating the retrieved data stored in the second data storage.

17. The method of claim 13, wherein the retrieved data comprises transactional data related to the entity, wherein retrieving the transactional data comprises sending a distributed query across the plurality of data storages to retrieve the transactional data related to the entity.

18. The method of claim 13 further comprising retrieving relationship data related to the entity, said relationship data for providing a composite view of the entity's relationship to other entities associated with the enterprise.

19. The method of claim 13 further comprising identifying a particular reference attribute as a particular identifier that is designated as a key for accessing the master reference data set.

20. For an enterprise, an apparatus for integrating entity data stored in a plurality of different data storages, said enterprise comprising a plurality of different applications that generate requests to access the entity data, said apparatus comprising:

a master reference manager for (i) receiving a plurality of reference data sets relating to an entity, and (ii) consolidating, in a first data storage, the received reference data sets into a master reference data set, said master reference data set representing a most reliable reference data set maintained by the enterprise for uniquely identifying the entity; and a data access module for (i) receiving, from the plurality of different applications, different data access requests regarding the entity that include a set of different attributes, each attribute in the set of different attributes designated as a first unique identifier that uniquely identifies the master reference data set, and (ii) processing each particular request by (a) using the attribute included in the request to uniquely identify a second unique identifier for the master reference data set, (b) cross-correlating, by accessing a cross-correlation table that stores one or more other unique identifiers associated with the entity in the different data storages, the second unique identifier to at least a third unique identifier associated with the entity in a second data storage different from the first data storage, and (c) retrieving data relating to the entity from the second data storage using the third identifier.

21. The apparatus of claim 20 further comprising a user interface module for (i) displaying a plurality of master reference data attributes for use in defining the master reference data set that is for identifying the entity and for accessing data stored regarding the entity, and (ii) receiving user identification of the set of different attributes as different unique identifiers for uniquely identifying the master reference data set.

22. The apparatus of claim 21, wherein receiving the user identification comprises receiving a selection of the set of different attributes used to retrieve the data relating to the entity stored in the second data storage.

23. The apparatus of claim 12, wherein the data related to the entity comprise relationship data related to the entity, said relationship data for providing a composite view of the entity's relationship to other entities associated with the enterprise.

24. The apparatus of claim 12, wherein the data related to the entity comprise transactional data related to interactions of the entity with the enterprise.

* * * * *